US011059295B2

(12) United States Patent
Akima et al.

(10) Patent No.: US 11,059,295 B2
(45) Date of Patent: Jul. 13, 2021

(54) INK-JET PRINTER, INK-JET PRINTING METHOD, AND WIPER

(71) Applicants: Mio Akima, Tokyo (JP); Hiroaki Takahashi, Kanagawa (JP); Takumi Atake, Kanagawa (JP)

(72) Inventors: Mio Akima, Tokyo (JP); Hiroaki Takahashi, Kanagawa (JP); Takumi Atake, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/677,910

(22) Filed: Nov. 8, 2019

(65) Prior Publication Data

US 2020/0171832 A1 Jun. 4, 2020

(30) Foreign Application Priority Data

Nov. 29, 2018 (JP) ............................ JP2018-223004

(51) Int. Cl.

*B41J 2/165* (2006.01)
*B41J 11/00* (2006.01)
*C09D 11/101* (2014.01)
*B41M 5/00* (2006.01)

(52) U.S. Cl.

CPC ................................ *B41J 2/16544* (2013.01)

(58) Field of Classification Search

CPC ... B41J 11/002; B41J 2/16544; C09D 11/101; B41M 5/0011; B41M 7/009

See application file for complete search history.

(56) References Cited

U.S. PATENT DOCUMENTS 5,706,038 A * 1/1998 Jackson ............... B41J 2/16538 347/31
2008/0092773 A1* 4/2008 Matsuyama .......... C09C 1/0081 106/31.65

FOREIGN PATENT DOCUMENTS

JP 2004-188808 7/2004
JP 2012-232529 11/2012
JP 2015-003397 1/2015

OTHER PUBLICATIONS

U.S. Appl. No. 16/423,261, filed May 28, 2019 Hiroko Ohkura, et al.

(Continued)

*Primary Examiner* — Jason S Uhlenhake

(74) *Attorney, Agent, or Firm* — Oblon, McClelland, Maier & Neustadt, L.L.P.

(57) ABSTRACT

An ink-jet printer is provided. The ink-jet printer includes: an ink container containing an ink, where the ink being a clear ink containing a resin; a discharge head having a nozzle configured to discharge the ink to a printing material; a heater configured to heat the printing material; and a cleaner including a wiper configured to wipe a nozzle formation surface of the discharge head. The ink-jet printer has a matte gloss printing mode imparting a matte gloss and a glossy gloss printing mode imparting a glossy gloss, and the ink-jet printer satisfies a formula below:

$$T_{matte} > T_{gloss}$$

where $T_{matte}$ represents a temperature (° C.) of the heater during printing in the matte gloss printing mode; and $T_{gloss}$ represents the temperature (° C.) of the heater during printing in the glossy gloss printing mode.

20 Claims, 4 Drawing Sheets

(56) References Cited

OTHER PUBLICATIONS

U.S. Appl. No. 16/412,481, filed May 15, 2019 Takahashi Hiroaki, et al.
U.S. Appl. No. 16/426,481, filed May 30, 2019 Kiminori Masuda, et al.

* cited by examiner

INK-JET PRINTER, INK-JET PRINTING METHOD, AND WIPER

CROSS-REFERENCE TO RELATED APPLICATIONS

This patent application is based on and claims priority pursuant to 35 U.S.C. § 119(a) to Japanese Patent Application No. 2018-223004, filed on Nov. 29, 2018, in the Japan Patent Office, the entire disclosure of which is hereby incorporated by reference herein.

BACKGROUND

Technical Field

Embodiments of this disclosure relate to an ink-jet printer, an ink-jet printing method, and a wiper.

Description of the Related Art

Impermeable recording media such as plastic films have been used for industrial purposes such as advertisements and signs and in packaging materials for foods, beverages, and daily necessities in order to improve durability such as light resistance, water resistance, and wear resistance. Various inks which can be used for such an impermeable recording medium have been developed.

An ink-jet recording device having a gloss control function has been developed.

SUMMARY

In accordance with an embodiment of the present invention, an ink-jet printer is provided. The ink-j et printer includes: an ink container containing an ink, where the ink being a clear ink containing a resin; a discharge head having a nozzle configured to discharge the ink to a printing material; a heater configured to heat the printing material; and a cleaner including a wiper configured to wipe a nozzle formation surface of the discharge head. The ink-jet printer has a matte gloss printing mode imparting a matte gloss and a glossy gloss printing mode imparting a glossy gloss, and the ink-jet printer satisfies a formula below:

$$T_{matte}>T_{gloss}$$

where $T_{matte}$ represents a temperature (° C.) of the heater during printing in the matte gloss printing mode; and $T_{gloss}$ represents the temperature (° C.) of the heater during printing in the glossy gloss printing mode.

In accordance with an embodiment of the present invention, an ink-jet printing method is provided. The ink-jet printing method includes the processes of: discharging an ink to a printing material using a discharge head having a nozzle to provide a printed layer, where the ink being a clear ink containing a resin; heating the printing material having the printed layer thereon by a heater; and wiping a nozzle formation surface of the discharge head with a wiper. The ink-jet printing method has a matte gloss printing mode imparting a matte gloss and a glossy gloss printing mode imparting a glossy gloss, and the heating is performed to satisfy a formula below:

$$T_{matte}>T_{gloss}$$

where $T_{matte}$ represents a temperature (° C.) of the heater during printing in the matte gloss printing mode; and $T_{gloss}$ represents the temperature (° C.) of the heater during printing in the glossy gloss printing mode.

In accordance with an embodiment of the present invention, a wiper for use in a cleaner that wipes a nozzle formation surface of a discharge head in an ink-jet printer is provided. The wiper includes at least two layers, and the wiper satisfies a formula below:

$$t1<t2$$

where t1 represents a thickness of a first layer from a side on which the wiper comes into contact with the nozzle formation surface; and t2 represents a total thickness of layers other than the first layer. The first layer has a porosity lower than that of at least one layer other than the first layer.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
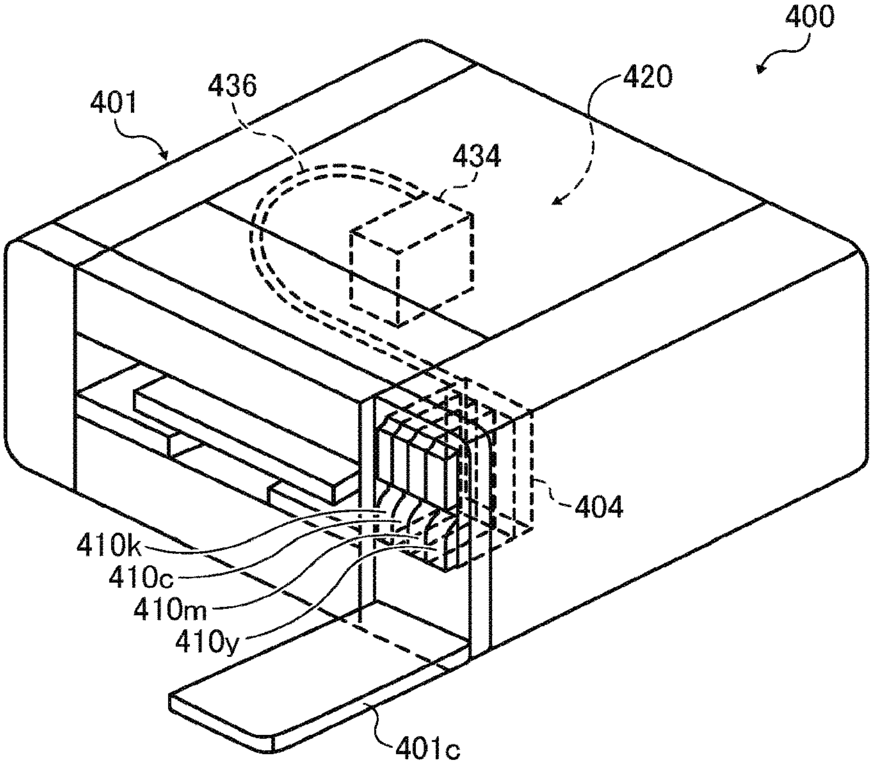
FIG. 1 is a schematic view illustrating an image forming apparatus which performs an image forming method of the present disclosure.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Ink-Jet Printer and Ink-Jet Printing Method An ink-jet printer of the present disclosure includes an ink container containing an ink, a discharge head having a nozzle configured to discharge the ink to a printing material, a heater configured to heat the printing material, and a cleaner including a wiper configured to wipe a nozzle formation surface of the discharge head. The ink is a clear ink containing a resin. The ink-jet printer has a matte gloss printing mode which imparts a matte gloss and a glossy gloss printing mode which imparts a glossy gloss. When the temperature of the heater during printing in the matte gloss printing mode is denoted as $T_{matte}$ (° C.) and the temperature of the heater when printing in the glossy gloss printing mode is denoted as $T_{gloss}$(° C.), the following formula $T_{matte}>T_{gloss}$ is satisfied. The ink-jet printer may include other units according to need.

The ink-jet printing method of the present disclosure includes a printing step in which an ink is discharged to a printing material using a discharge head having a nozzle to provide a printed layer, a heating step in which the printing material having the printed layer thereon is heated with a heater, and a cleaning step in which a nozzle formation surface of the discharge head is wiped with a wiper. The ink is a clear ink containing a resin. The ink-jet printing method has a matte gloss printing mode which imparts a matte gloss and a glossy gloss printing mode which imparts a glossy gloss. In the heating step, when the temperature of the heater when printing in the matte gloss printing mode is denoted as $T_{matte}$ (° C.) and the temperature of the heater when printing in the glossy gloss printing mode is denoted as $T_{gloss}$ (° C.), the following formula $T_{matte}>T_{gloss}$ is satisfied. The ink-jet printing method may include other steps according to need.

Conventional clear inks which are capable of controlling gloss contain a larger amount of resins compared with color inks. Therefore, the conventional clear inks cause an undesirable phenomenon in which the resin gets attached to the nozzle formation surface of the discharge head during printing by an ink-jet printer and firmly adhered thereto.

In a related art, the glossiness is adjusted by controlling the degree of filming of the surfaces of droplets of a color ink containing a coloring material. Specifically, the ink droplets are heated by a heater at a filming control temperature that corresponds to the minimum film forming temperature at which the filming of the surfaces of the ink droplets starts. On the other hand, the ink-jet printer and the ink-jet printing method of the present disclosure can provide an adequate glossiness difference by using a clear ink containing no coloring material. The ink-jet printer and the ink-jet printing method are capable of controlling the gloss to have either a matte tone or a glossy tone.

The ink-jet printer and the ink-jet printing method of the present disclosure control the gloss to have either a glossy tone or a matte tone by using a clear ink containing a resin and controlling the temperature of the heater. When imparting a matte gloss, the temperature of the heater is set higher compared to that in the glossy gloss imparting mode. As the temperature of the heater is high, dots of the clear ink containing a resin are prevented from wetting and spreading, coalescence of adjacent dots is prevented, and dots with a high pile height are formed. These dots form a surface unevenness and impart a matte gloss.

On the other hand, when imparting a glossy gloss, the temperature of the heater is set lower compared to that in the matte gloss imparting mode. As the temperature of the heater is low, wetting and spreading of dots of the clear ink containing a resin are accelerated and coalescence of adjacent dots is accelerated. Thus, a smooth surface is formed, and a glossy gloss is imparted.

The ink-jet printer of the present disclosure is capable of controlling the gloss to have either a mat tone or a glossy tone by using a clear ink containing a resin and having a matte gloss printing mode which imparts a matte gloss and a glossy gloss printing mode which imparts a glossy gloss, wherein, when the temperature of the heater during printing in the matte gloss printing mode is denoted as $T_{matte}$ (° C.) and the temperature of the heater when printing in the glossy gloss printing mode is denoted as $T_{gloss}$ (° C.), the following formula $T_{matte}>T_{gloss}$ is satisfied.

In the ink-jet printer of the present disclosure, the temperature of the heater satisfies the following formula, $T_{matte}>T_{gloss}$, and preferably satisfies the following formula, $T_{matte}-T_{gloss}\geq 10$° C., and more preferably satisfies the following formula, $T_{matte}-T_{gloss}\geq 20$° C.

In the matte gloss printing mode, the ink-j et printer increases the temperature of the heater to prevent wetting and spreading of the dots and form dots having a high pile height to form a surface having a large unevenness. On the other hand, in the glossy gloss printing mode, the ink-jet printer decreases the temperature of the heater to accelerate wetting and spreading of the dots and make adjacent dots coalesce with each other to form a smooth surface.

The temperature $T_{matte}$ (° C.) of the heater when printing in the matte gloss printing mode is preferably 50° C. or more, and more preferably 50° C. or more but 80° C. or less.

The temperature $T_{gloss}$ (° C.) of the heater when printing in the glossy gloss printing mode is preferably 70° C. or less, and more preferably 60° C. or less.

By setting the temperature to such a temperature range, the ink-j et printer exhibits a large change in glossiness in each printing mode that uses the clear ink.

The temperature of the heater may be measured by, for example, a method of directly measuring the temperature of the heater by installing a thermocouple in the heater, or a method of measuring the temperature around the heater by a radiation thermometer or the like in a non-contact manner and regarding the measured temperature as the temperature of the heater.

In the present disclosure, when the coverage of a matte printed image printed in the matte gloss printing mode is denoted as $D_{matte}$ and the coverage of a glossy printed image printed in the glossy gloss printing mode is denoted as $D_{gloss}$, the following formula, $D_{gloss}>D_{matte}$ is preferably satisfied, and the following formula, $D_{gloss}-D_{matte}>10\%$ is more preferably satisfied.

In the glossy gloss printing mode, the coverage of the printed image is made high, because a smooth surface is more easily formed when the coverage is high. On the other hand, in the matte gloss printing mode, the coverage of the printed image is made low, because coalescence of adjacent dots occurs and formation of a surface unevenness is unlikely to be formed when the coverage is high.

Here, the coverage is defined by the following formula.

$$\text{Coverage (\%)}=\text{number of clear ink printed dots}/(\text{longitudinal resolution}\times\text{lateral resolution})\times 100$$

In the formula, the "number of clear ink printed dots" represents the number of dots actually printed with the clear ink per unit area. The "vertical resolution" and the "horizontal resolution" refer to the respective resolutions per unit area. In a case in which the clear ink is overlappingly printed on the same dot position, the "number of clear ink printed dots" indicates the total number of dots actually printed with the clear ink per unit area.

Note that, when the coverage is 100%, the weight of a single-color ink per pixel is maximum.

Ink Container

The ink container stores the ink.

The ink container is not specifically limited as long as it is a member which is capable of storing the ink. Examples of the ink container include, but are not limited to, an ink storing container and an ink tank.

The ink storing container includes a container and the ink stored in the container and may further include other members appropriately selected according to the necessity.

The container is not specifically limited, and the shape, structure, size, material, etc. of the container may be appropriately selected in accordance with the intended purpose.

Examples of the container include, but are not limited to, containers including at least an ink bag formed of an aluminum laminate film or a resin film.

Examples of the ink tank include, but are not limited to, a main tank, and a sub-tank.

Discharge Head

The discharge head is configured to discharge the ink to form a printed layer.

The discharge head includes a nozzle plate, a pressure chamber, and a stimulus generator.

Nozzle Plate

The nozzle plate includes a nozzle substrate and an ink repellent film on the nozzle substrate.

Pressure Chamber

The pressure chamber is disposed corresponding to each of multiple nozzle holes provided on the nozzle plate. The pressure chamber is an individual channel communicated with each nozzle hole. The pressure chamber may also be referred to as ink flow path, a pressurized liquid chamber, a discharge chamber, or a liquid chamber.

Stimulus Generator

The stimulus generator is configured to generate a stimulus to be applied to the ink.

The stimulus generated by the stimulus generator is not particularly limited and may be appropriately selected depending on the objective. Examples thereof include, but are not limited to, heat (temperature), pressure, vibration, and light. Each of these stimuli may be used alone or in combination with others. Among these, heat and pressure are preferable.

Examples of the stimulus generator include, but are not limited to, heaters, pressurizers, piezoelectric elements, vibration generators, ultrasonic wave oscillators, and lights. Specific examples of the stimulus generator include, but are not limited to, a piezoelectric actuator such as a piezoelectric element; a thermal actuator using phase change of ink caused by film boiling, using a thermoelectric conversion element such as a heat element; a shape-memory alloy actuator using a metal phase change caused by temperature change; and an electrostatic actuator using an electrostatic force.

When the stimulus is "heat", the ink in the ink discharge head is given heat energy corresponding to a recording signal by, for example, a thermal head. In this case, bubbles are generated in the ink by the heat energy, and the ink is discharged as droplets from the nozzle holes of the nozzle plate by the pressure of the bubbles.

When the stimulus is "pressure", for example, a piezoelectric element bonded to the pressure chamber in the ink flow path in the ink discharge head is applied with a voltage, to make the piezoelectric element bent. As a result, the volume of the pressure chamber is reduced, and the ink is discharged as droplets from the nozzle holes of the ink discharge head.

Among these, a piezo method that applies a voltage to a piezo element to jet an ink is preferable.

Heating Step and Heater

The heating step is a step in which the printing material having the printed layer thereon is heated by the heater.

The heater is a device configured to heat and dry the printed surface and the reverse surface of a recording medium as the printing material. Examples of the heater include, but are not limited to, an infrared heater, a hot air heater, and a heat roller. Each of these may be used alone or in combination with others.

The method of drying the recording medium as the printing material is not particularly limited and may be appropriately selected according to the objective. For example, the method may include: bringing a heated fluid, such as warm air, into contact with the recording medium to which the ink is applied; bringing a heat member into contact with the recording medium to which the ink is applied to heat the recording medium by heat transfer; or irradiating the recording medium to which the ink is applied with energy rays such as infrared rays and far-infrared rays to heat the recording medium.

The heating can be performed either before, during, or after a printing.

The heating before or during the printing makes it possible to make a print on a heated recording medium. The heating after the printing makes it possible to dry the printed matter.

The heating duration is not particularly limited and may be appropriately selected depending on the intended purpose as long as the surface temperature of the recording medium can be controlled to a desired temperature.

The heating duration is preferably controlled by controlling the conveyance speed of the recording medium as the printing material.

Cleaning Step and Cleaner

The cleaning step is a step in which the nozzle formation surface of the discharge head is wiped with the wiper and is performed by the cleaner.

The cleaner has the wiper configured to wipe the nozzle formation surface of the discharge head and may further include other members according to need.

The cleaner wipes the ink attached to the nozzle formation surface (ink discharge surface of the nozzle plate) when the ink is discharged from the nozzle holes of the discharge head.

When cleaning the discharge head, the discharge head may not be moved, and the ink-jet unit having the wiper may be moved to clean the discharge head.

The cleaner includes a sheet-like wiper, a roller configured to send out the sheet-like wiper, a pressing roller configured to press the sent out wiper to the nozzle plate surface, and a winding roller which collects the wiper used for the wiping. The cleaner may be included in a maintenance and recovery mechanism in the ink-jet printer, or the cleaner may include a maintenance and recovery mechanism in the ink-jet printer.

The ink-jet printer may further include a rubber blade that wipes the nozzle plate surface in addition to the sheet-like wiper.

In the cleaner, a roller as a pressing member can adjust the pressing force by using a spring to adjust the distance between the sheet-like wiper and the nozzle plate surface. The pressing member is not limited to be the roller and may also be a fixed resin or a rubber member. When the cleaner has a rubber blade, etc., a mechanism which brings the rubber blade, etc., into contact with the sheet-like wiper may be provided so that the cleaning function of the rubber blade, etc. is imparted to the sheet-like wiper.

Wiper

The wiper is configured to wipe the nozzle formation surface of the discharge head and is preferably in a sheet-like shape.

The sheet-like wiper is comprised of nonwoven fabric and may be a one-layer wiper. Further, the sheet-like wiper may be a multi-layer wiper having a two-layer structure comprised of the first layer and the second layer from the side which comes into contact with the nozzle formation surface. Other than the above-described structure, the sheet-like wiper may have another structure such as a three-layer structure in which the wiper is backed with a film for preventing the bleed-through of the absorbed ink and improving the strength of the wiper, or a multi-layer structure in which a plurality of absorption layers having different absorbabilities are provided after the second layer.

Other than the nonwoven fabric, examples of the material constituting the wiper include, but are not limited to, a woven fabric, a knitted fabric, and a porous material. Among these materials, a nonwoven fabric which is relatively easy to control the thickness and porosity is preferably used as the material constituting the first layer of the wiper.

Examples of fibrous materials such as nonwoven fabric, woven fabric, and knitted fabric include, but are not limited to, cotton, hemp, silk, pulp, nylon, vinylon, polyester, polypropylene, polyethylene, rayon, cupro, acrylic, and polylactic acid. The nonwoven fabric may be comprised of either one type of fiber or multiple types of fibers mixed.

Examples of the porous materials include, but are not limited to, polyurethane, polyolefin, and PVA.

Examples of the method for producing the nonwoven fabric in the shape of a web include, but are not limited to, wet, dry, spun-bounded, melt-blown, and flash spinning. Examples of the method for web bonding include, but are not limited to, spunlace, thermal bonding, chemical bonding, and needle punch.

Preferably, the wiper is comprised of at least two layers and the following formula t1<t2 is satisfied, where the thickness of the first layer from a side which contacts the nozzle formation surface is denoted as t1 and the total thickness of the layers other than the first layer is denoted as t2. The porosity of the first layer of the wiper is preferably smaller than the porosity of at least one layer other than the first layer.

When the thickness of the first layer in the wiper is smaller than the thickness of the layers other than the first layer and the porosity of the first layer is smaller than the porosity of at least one layer other than the first layer, the property of scraping the firmly-adhering ink is improved, thereby improving the property of removing the firmly-adhering ink. Here, the porosity is calculated from the following equation (1).

$$\text{Porosity} = 1 - \frac{\text{apparent density}}{\text{true density}} \qquad \text{Equation (1)}$$

In the case of a sheet-like nonwoven fabric, the aforementioned "true density" represents the true density of the fiber forming the sheet. The "apparent density" can be calculated from the basis weight and the thickness of the sheet-like material by dividing the basis weight by the thickness.

With respect to the wiper for removing the firmly-adhering ink, the property of scraping the firmly-adhering ink increases when the thickness is small and the porosity is small. However, when the thickness is small and the porosity is small, the wiper cannot retain liquid components such as an ink and a cleaning fluid. As a result, the cleaning property is insufficient when the wiper is in a single-layer structure. Hence, the wiper is provided with a portion which is capable of maintaining the liquid components in a layer other than the first layer, and the above-described relationship between the layers is satisfied.

The porosity of the first layer is preferably 0.60 or greater but 0.85 or less, and more preferably 0.75 or greater but 0.80 or less. When the porosity of the first layer is 0.60 or greater but 0.85 or less, the property of removing the firmly-adhering ink is improved. Further, when the porosity of the first layer is 0.60 or greater but 0.85 or less, the wiper does not become a film-like shape and allows liquids to permeate much better.

The porosity of at least one layer other than the first layer is preferably 0.80 or greater but 0.99 or less. When the porosity of the at least one layer other than the first layer is in the aforementioned range, liquid absorbability is improved. When the first layer is combined with such a layer other than the first layer, both the property of scraping the firmly-adhering ink and liquid absorbability are improved, thereby improving wiping property.

The average thickness of the wiper is preferably 0.1 mm or greater but 3 mm or less, and more preferably 0.2 mm or greater but 0.7 mm or less. When the average thickness of the wiper is 0.1 mm or more, the saturated water absorption amount per unit area of the wiper becomes adequate, and the wiper can sufficiently absorb the ink that is the object to be removed. Further, when the average thickness of the wiper is 3 mm or less, the liquid components of the ink can be suitably moved from the first layer to a layer other than the first layer of the wiper, without impairing the effect of absorbing the liquid components to the layer other than the first layer, thus making the ink-jet printer downsized.

The first layer of the wiper is preferably comprised of a nonwoven fabric. When the first layer of the wiper is made of a nonwoven fabric, the thickness and porosity of the wiper can be easily set to within desired ranges.

The wiping surface of the wiper preferably has a surface roughness Rz of 170 μm or more, obtained by measuring the surface roughness by a laser microscope, etc. When the surface roughness Rz of the wiping surface of the wiper is 170 μm or more, the meniscus in the nozzle is hard to break and the nozzle surface can be wiped without causing a discharge defect.

An image forming apparatus having the above-described cleaner is described below.

Figure 3:
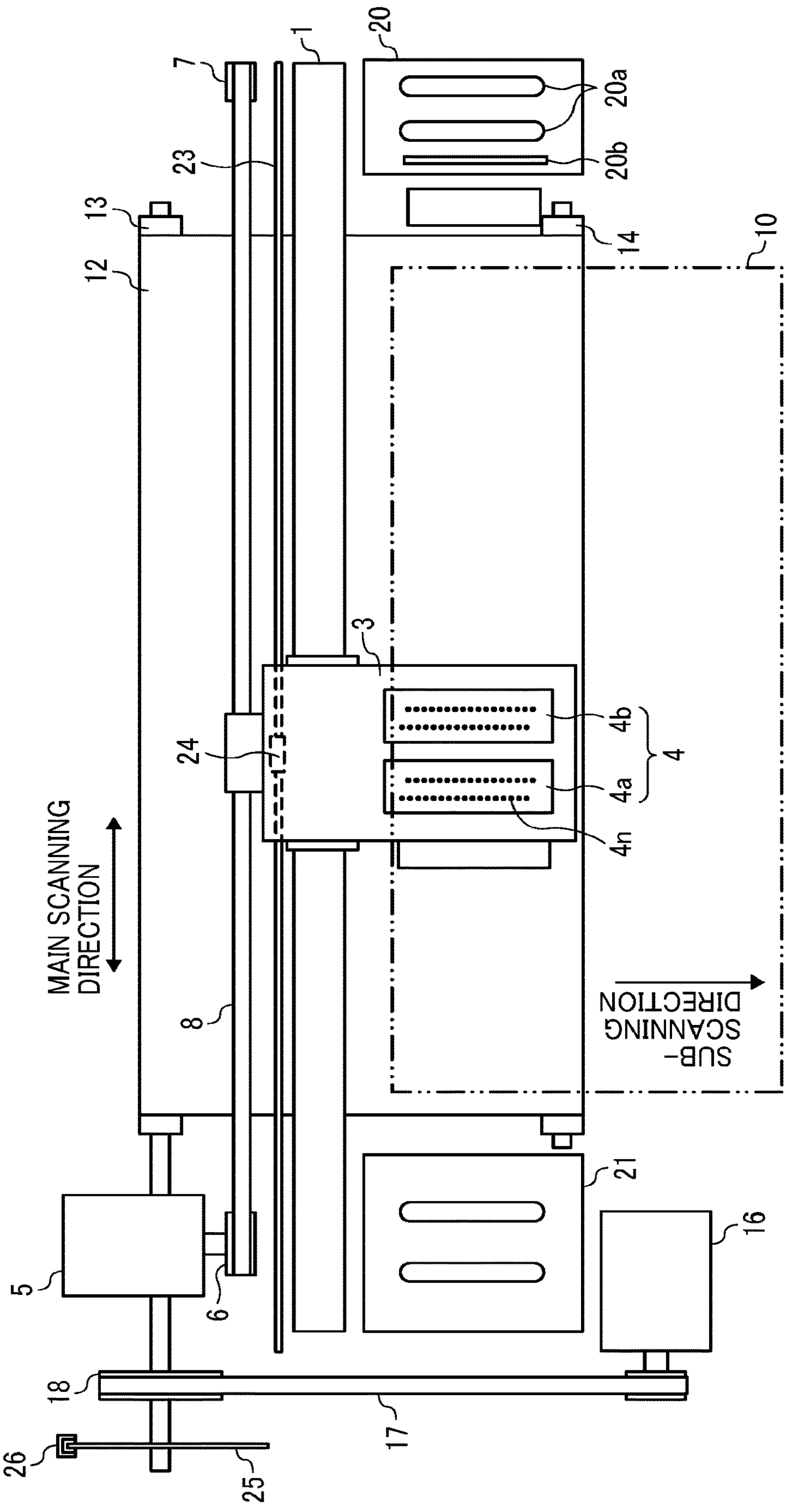
FIG. 3 is a schematic view illustrating another image forming apparatus which performs the image forming method of the present disclosure.

FIG. 3 is a schematic view of an image forming apparatus having the cleaner, which is provided with a serial droplet discharger. This image forming apparatus is described in detail with reference to FIGS. 3 to 6.

A carriage 3 is moveably held by a main guide member 1 and a sub guide member laterally bridging left and right side plates. Moreover, a main scanning motor 5 reciprocatingly moves the carriage 3 in a main-scanning direction (carriage movement direction) via a timing belt 8 supported between a driving pulley 6 and a driven pulley 7.

Recording heads 4*a*, 4*b* (when not distinguished, referred to as the "recording head") consisting of a liquid discharge head are mounted on the carriage 3. The recording head 4 discharge ink droplets of each color, for example, yellow (Y), cyan (C), magenta (M), and black (K). Further, the recording head 4 has a nozzle array consisting of a plurality of nozzles 4*n* arranged in a sub-scanning direction orthogonal to the main-scanning direction, and is mounted with the ink droplet discharge direction facing down.

Figure 4:
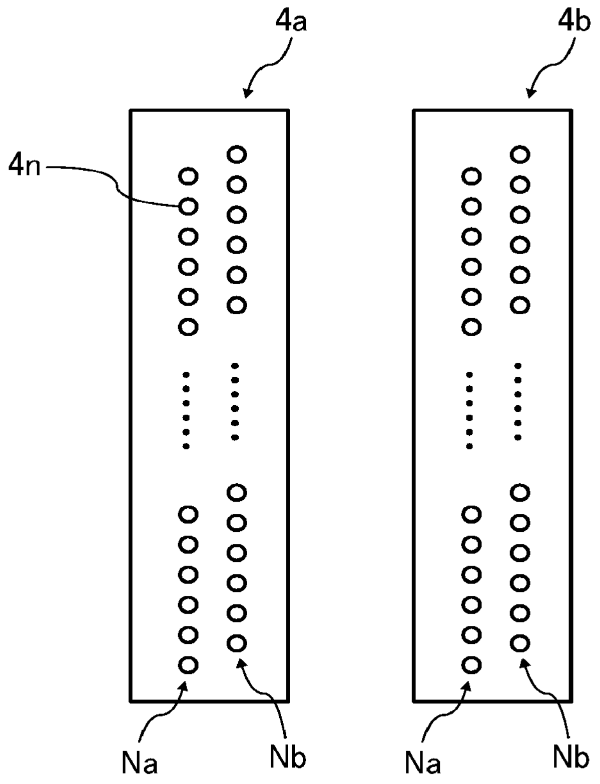
FIG. 4 is a schematic view illustrating a nozzle plate to be wiped with a wiper in the image forming apparatus.

The recording head 4 has two nozzle arrays Na and Nb in each of which a plurality of nozzle 4*n* are arranged as illustrated in FIG. 4.

Examples of the liquid discharge head constituting the recording head 4 include, but are not limited to, a piezoelectric actuator such as a piezoelectric element, and a thermal actuator that utilizes phase change of a liquid caused by film boiling using an electrothermal conversion element such as a heat element.

On the other hand, the image forming apparatus is provided with a conveyance belt 12 that electrostatically attracts a sheet in order to convey a sheet 10 to a position facing the recording head 4. The conveyance belt 12 is an endless belt and is supported between a conveyance roller 13 and a tension roller 14.

A sub-scanning motor 16 rotatingly drives the conveyance roller 13 via a timing belt 17 and a timing pulley 18 so that the conveyance belt 12 circumferentially moves in the sub-scanning direction. This conveyance belt 12 is charged by a charging roller while circulating.

A maintenance and recovery mechanism 20 having the cleaner which performs maintenance and recovery of the recording head 4 is arranged at one side of the conveyance belt 12 at a side in the main-scanning direction of the carriage 3. A dummy discharge receiver 21 which receives a dummy discharge from the recording head 4 is arranged at one side of the conveyance belt 12 on the other side of a main-scanning direction of the carriage 3.

The maintenance and recovery mechanism 20 includes, for example, cap members 20*a* that cap the nozzle formation surface (surface on which the nozzles are formed) of the recording head 4, a cleaner 20*b* that wipes the nozzle formation surface, and a dummy discharge receiver to which droplets which do not contribute to image formation are discharged.

The image forming apparatus stretches an encoder scale 23 which formed a predetermined pattern between the side plates along a main-scanning direction of the carriage 3. The carriage 3 is provided with an encoder sensor 24 consisting of a transmission photosensor that reads the pattern of the encoder scale 23. The encoder scale 23 and the encoder sensor 24 form a linear encoder (main scanning encoder) that detects the movement of the carriage 3.

The image forming apparatus attaches a code wheel 25 to a shaft of the conveyance roller 13. The code wheel 25 is provided with an encoder sensor 26 consisting of a transmission photosensor that detects the formed pattern. The code wheel 25 and the encoder sensor 26 form a rotary encoder (sub scanning encoder) that detects the moved amount and the moved position of the conveyance belt 12.

The sheet 10 is fed into the image forming apparatus configured as described above from a sheet feeding tray and attracted on the charged conveyance belt 12, so that the sheet 10 is conveyed in the sub-scanning direction due to the circumferential movement of the conveyance belt 12.

The image forming apparatus discharges the ink droplets onto the stopped sheet 10 to record one line by driving the recording head 4 in accordance with an image signal while the carriage 3 is moved in a main-scanning direction. The image forming apparatus records the next line after conveying a predetermined number of sheets 10.

The image forming apparatus finishes a recording operation in response to a recording completion signal or a signal that indicates that the rear end of the sheet 10 has reached the recording region, and then ejects the sheet 10 to a paper ejection tray.

When the image forming apparatus cleans the recording head 4, the carriage 3 is moved to the maintenance and recovery mechanism 20 while waiting for the printing (recording), and the cleaning is performed by the maintenance and recovery mechanism 20 having the cleaner. When the image forming apparatus cleans the recording head 4, the recording head 4 may not be moved, and the maintenance and recovery mechanism 20 may be moved so as to clean the head.

The recording head 4 illustrated in FIG. 3 has two nozzle arrays Na and Nb, in which a plurality of nozzles 4*n* are arranged as illustrated in FIG. 4. The nozzle array Na of one recording head 4*a* discharges black (K) droplets, and the other nozzle array Nb discharges cyan (C) droplets. The nozzle array Na of one recording head 4*b* discharges magenta (M) droplets, and the other nozzle array Nb discharges yellow (Y) droplets.

Figure 5:
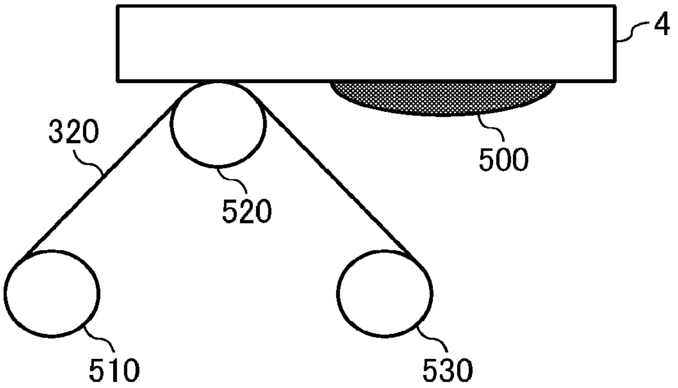
FIG. 5 is a schematic view illustrating a cleaner in an ink-jet printer of the present disclosure.

As illustrated in FIG. 5, the cleaner 20*b* mainly includes a sheet-like wiper 320, a roller 510 configured to send out the sheet-like wiper 320, a roller 520 as a pressing member configured to press the sent out wiper 320 against the nozzle formation surface, and a winding roller 530 configured to collect the wiper 320 used for the wiping. The cleaner 20*b* may further include, in addition to the sheet-like wiper, a rubber blade, etc., for wiping the nozzle formation surface. The roller 520 as a pressing member adjusts the distance between the cleaner and the nozzle formation surface using a spring to adjust the pressing force. The pressing member is not limited to being a roller but may also be a fixed resin or a rubber member. When the cleaner has a rubber blade, etc., a mechanism which brings the rubber blade, etc., into contact with the sheet-like wiper may be provided so that the cleaning function of the rubber blade, etc. is imparted to the sheet-like wiper.

After a specific amount of a cleaning fluid is applied to the wiper 320, the cleaner 20*b* and the recording head 4 move relative to each other while the wiper 320 is pressed against the nozzle formation surface, so that foreign matter 500 attached to the nozzle formation surface is wiped off. Examples of the foreign matter 500 adhered to the nozzle formation surface include mist ink generated when the ink is discharged from the nozzle, the ink adhering when the ink was sucked from the nozzle due to cleaning, etc., firmly-adhering ink which is the mist ink and the ink adhering to the cap member dried on the nozzle formation surface, paper dust generated from the printing material, etc. The cleaning fluid may be included in the wiper in advance. Further, depending on the sequence, wiping may be performed without applying the cleaning fluid. In particular, when it is assumed that the ink was dried and firmly adhered to the nozzle formation surface due to a long standby time of the image forming apparatus, it is desirable to remove the dried ink by wiping the nozzle formation surface multiple times with a sheet-like wiper containing the cleaning fluid.

Figure 6:
FIG. 6 is a schematic cross-sectional diagram of a sheet-like wiper.

FIG. 6 is a schematic cross-sectional diagram of the sheet-like wiper 320.

The sheet-like wiper 320 illustrated in FIG. 6 is comprised of a nonwoven fabric, and forms a two-layer structure comprising a first layer 610 and a second layer 620 from the side which comes into contact with the nozzle formation surface. In addition to the two-layer structure, the sheet-like wiper may have another structure such as a three-layer structure in which the wiper is backed with a film for preventing the bleed-through of the absorbed ink and improving the strength of the wiper, or a multi-layer structure in which a plurality of absorption layers having different absorbabilities are provided after the second layer.

Other than the nonwoven fabric, examples of the material constituting the wiper 320 include, but are not limited to, a woven fabric, a knitted fabric, and a porous material. Among these materials, a nonwoven fabric which is relatively easy to control the thickness and porosity is preferably used as the material constituting the first layer of the wiper. Examples of fibrous materials such as nonwoven fabric, woven fabric, and knitted fabric include, but are not limited to, cotton, hemp, silk, pulp, nylon, vinylon, polyester, polypropylene, polyethylene, rayon, cupro, acrylic, and polylactic acid. The nonwoven fabric may be comprised of either one type of fiber or multiple types of fibers mixed. Examples of the method for producing the nonwoven fabric in the shape of a web include, but are not limited to, wet, dry, spun-bounded, melt-blown, and flash spinning. Examples of the method for web bonding include, but are not limited to, spunlace, thermal bonding, chemical bonding, and needle punch.

When the thickness of the first layer in the sheet-like wiper is smaller than the thickness of the layers other than the first layer and the porosity of the first layer is smaller than the porosity of at least one layer other than the first layer, the property of scraping the firmly-adhering ink is improved, thereby improving the property of removing the firmly-adhering ink.

Ink

A clear ink can be used as the ink. The clear ink refers to a colorless and transparent ink substantially free of any coloring material.

The clear ink is of a water-based clear ink and a solvent-based clear ink. In the present disclosure, the clear ink includes both a water-based clear ink and a solvent-based clear ink. Hereinafter, both of them are collectively referred to as a clear ink.

The clear ink contains a resin, and preferably contains a solvent and/or water. The solvent and water may be used together. the clear ink may further include other components in accordance with need.

Water

The water is not particularly limited and may be appropriately selected depending on the intended purpose. Examples of the water include, but are not limited to, pure water and ultrapure water such as ion-exchanged water, ultrafiltrated water, reverse osmotic water, and distilled water. The above-listed examples may be used alone or in combination.

The proportion of water is not particularly limited. In a water-based clear ink, the proportion of water may be 0.1% by mass or more but 80% by mass or less, preferable 15% by mass or more but 60% by mass or less, relative to the total amount of the clear ink. When the proportion is 15% by mass or more, the viscosity is prevented from increasing, and the discharge stability can be improved. When the proportion of water is 60% by mass or less, the wettability to impermeable substrates is favorable and the image quality can be improved.

Organic Solvent

The clear ink may contain an organic solvent. The organic solvent is not particularly limited and may be appropriately selected depending on the intended purpose. Examples of the organic solvent include, but are not limited to, a water-soluble organic solvent. A water-soluble organic solvent refers to, for example, an organic solvent soluble in 100 g of water at 25° C. in an amount of 5 g or more.

Examples of the water-soluble organic solvent include polyvalent alcohols such as ethylene glycol, diethylene glycol, 1,2-propanediol, 1,3-propanediol, 1,2-butanediol, 1,3-butanediol, 2,3-butanediol, 3-methyl-1,3-butanediol, 3-methoxy-3-methylbutanol, triethylene glycol, polyethylene glycol, polypropylene glycol, 1,5-pentanediol, 2-methyl-2,4-pentanediol, 1,6-hexanediol, glycerin, 1,2,6-hexanetriol, 2-ethyl-1,3-hexanediol, ethyl-1,2,4-butanetriol, 1,2,3-butanetriol, and petriol; polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and dipropylene glycol monomethyl ether; polyvalent alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-imidazolidinone, ε-caprolactam, and γ-butyrolactone; amides such as formamide, N-methylformamide, and N,N-dimethylformamide; amines such as monoethanol amine, diethanol amine, and triethyl amine; sulfur-containing compounds such as dimethyl sulfoxide, sulfolane, and thiodiethanol; propylene carbonates; and ethylene carbonates. These water-soluble organic solvents may be used alone or in combination.

The proportion of the organic solvent in the clear ink is not particularly limited and can be suitably selected to suit to a particular application, but is preferably from 10% to 60% by mass, more preferably from 20% to 60% by mass, for drying property and discharge reliability of the ink.

Resin

The resin is not particularly limited and can be suitably selected to suit to a particular application. Specific examples thereof include, but are not limited to, polyurethane resins, polyester resins, acrylic resins, vinyl acetate resins, styrene resins, butadiene resins, styrene-butadiene resins, vinyl chloride resins, acrylic styrene resins, and acrylic silicone resins.

When preparing ink, it is preferable to add a resin particle consisting of the resin. The resin particle may be added to the ink in a resin emulsion state in which the resin is dispersed in water as a dispersion medium. The resin particle may be an appropriately synthesized product or a commercially available product. One type of resin particle may be used alone, or two or more types of resin particles may be used in combination. Among these resins, the resin particle is preferably comprised of a polyurethane resin. By adding a polyurethane resin, a coating film formed using the clear ink itself becomes tough. As the coating film itself becomes tough, it is prevented that the interior of the coating film breaks so that a part of the coating film peels off and that the surface state of the coating film changes to change the color of the rubbed portion.

Polyurethane Resin

Examples of the polyurethane resin include, but are not limited to, polyether polyurethane resin, polycarbonate polyurethane resin, and polyester polyurethane resin.

The polyurethane resin is not particularly limited and may be appropriately selected depending on the intended purpose. Examples of the polyurethane resin include a polyurethane resin obtained by reacting a polyol with a polyisocyanate.

Polyol

Examples of the polyol include, but are not limited to, polyether polyols, polycarbonate polyols, and polyester polyols. These polyols may be used alone or in combination.

Polyether Polyols

Specific examples of the polyether polyol include, but are not limited to, those obtained by an addition polymerization of at least one type of compound having 2 or more active hydrogen atoms, as a starting material, with an alkylene oxide.

Examples of the compound having 2 or more active hydrogen atoms include, but are not limited to, ethylene glycol, diethylene glycol, triethylene glycol, propylene glycol, trimethylene glycol, 1,3-butanediol, 1,4-butanediol, 1,6-hexanediol, glycerin, trimethylolethane, and trimethylolpropane. These compounds having 2 or more active hydrogen atoms may be used alone or in combination.

Examples of the alkylene oxide include, but are not limited to, ethylene oxide, propylene oxide, butylene oxide, styrene oxide, epichlorohydrin, and tetrahydrofuran. These alkylene oxide may be used alone or in combination.

The polyether polyol is not particularly limited and may be appropriately selected depending on the intended purpose, but polyoxytetramethylene glycols and polyoxypropylene glycols are preferable from the point of obtaining a binder for an ink capable of imparting an extraordinarily excellent scratch resistance. These polyether polyols may be used alone or in combination.

Polycarbonate Polyols

Further, examples of the polycarbonate polyols which can be used for producing the polyurethane resin particles include, but are not limited to, polycarbonate polyols obtained by reacting a carbonate ester with a polyol, and polycarbonate polyols obtained by reacting phosgene with bisphenol A. The above-listed examples may be used alone or in combination.

Examples of the carbonate ester include, but are not limited to, methyl carbonate, dimethyl carbonate, ethyl carbonate, diethyl carbonate, cyclocarbonate, and diphenyl carbonate. These carbonate esters may be used alone or in combination.

Examples of the polyol include dihydroxy compounds having relatively low molecular weights such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-hepetanediol, 1,8-octanediol, 1,9-nonanediol, 1,10-decanediol, 1,11-undecanediol, 1,12-dodecanediol, 1,4-cyclohexanediol, 1,4-cyclohexanedimethanol, hydroquinone, resorcin, bisphenol-A, bisphenol-F, and 4,4'-bisphenol; polyether polyols such as polyethylene glycols, polypropylene glycols, and polyoxytetramethylene glycols; and polyester polyols such as polyhexamethylene adipates, polyhexamethylene succinates, and polycaprolactones. These polyols may be used alone or in combination.

Polyester Polyols

Examples of the polyester polyol include, but are not limited to, polyester polyols obtained by an esterification reaction between a low-molecular-weight polyol and a polycarboxylic acid, polyester polyols obtained by a ring-opening polymerization reaction of a cyclic ester compound such as ε-caprolactone, and polyester polyols obtained by copolymerization of the above-listed polyesters. These polyester polyols may be used alone or in combination.

Examples of the low-molecular-weight polyol include, but are not limited to, ethylene glycol and propylene glycol. The above-listed examples may be used alone or in combination.

Examples of the polycarboxylic acid include, but are not limited to, succinic acid, adipic acid, sebacic acid, dodecanedicarboxylic acid, terephthalic acid, isophthalic acid, phthalic acid, and anhydrides or ester-forming derivatives thereof. These polycarboxylic acids may be used alone or in combination.

Polyisocyanate

Examples of the polyisocyanate include, but are not limited to, aromatic diisocyanates such as phenylene diisocyanate, tolylene diisocyanate, diphenylmethane diisocyanate, and naphthalene diisocyanate; and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, and 2,2,4-trimethylhexamethylene diisocyanate. These polyisocyanates may be used alone or in combination. Among such polyisocyanates, alicyclic diisocyanates are preferable in terms of weather resistance.

Furthermore, the use of at least one alicyclic diisocyanate makes it easier for the polyurethane resin to obtain the intended coating film strength and the intended scratch resistance.

Examples of the alicyclic diisocyanate include, but are not limited to, isophorone diisocyanate and dicyclohexylmethane diisocyanate.

The proportion of the alicyclic diisocyanate is preferably 60% by mass or greater relative to a total amount of isocyanate compounds.

Method for Producing Polyurethane Resin

The polyurethane resin is not specifically limited and can be obtained according to production methods hitherto commonly used, such as the following method.

First, the polyol and the polyisocyanate, in an equivalent ratio that isocyanate group becomes excessive, are allowed to react in the presence or absence of an organic solvent, to prepare an isocyanate-terminated urethane prepolymer.

Next, anionic groups in the isocyanate-terminated urethane prepolymer are neutralized with a neutralizer, if necessary. The isocyanate-terminated urethane prepolymer is thereafter allowed to react with a chain extender, followed by removal of the organic solvent from the reaction system, if necessary, to obtain a polyurethane resin.

Examples of the organic solvents which can be used for producing the polyurethane resin include, but are not limited to, ketones such as acetone and methyl ethyl ketone; ethers such as tetrahydrofuran and dioxane; acetic acid esters such as ethyl acetate and butyl acetate; nitriles such as acetonitrile; and amides such as dimethyl formamide, N-methylpyrrolidone, and N-ethylpyrrolidone. These organic solvents may be used alone or in combination.

Examples of the chain extender include, but are not limited to, polyamines and other active hydrogen group-containing compounds.

Examples of the polyamines include, but are not limited to, diamines such as ethylene diamine, 1,2-propanediamine, 1,6-hexamethylenediamine, piperazine, 2,5-dimethylpiperazine, isophoronediamine, 4,4'-dicyclohexylmethane diamine, and 1,4-cyclohexane diamine; polyamines such as diethylene triamine, dipropylene triamine, and triethylene tetramine; hydrazines such as hydrazine, N,N'-dimethylhydrazine, and 1,6-hexamethylene bishydrazine; and dihydrazides such as succinic dihydrazide, adipic dihydrazide, glutaric dihydrazide, sebacic dihydrazide, and isophthalic dihydrazide. These polyamines may be used alone or in combination.

Examples of the other active hydrogen group-containing compounds include, but are not limited to, glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone; and water. These other active hydrogen group-containing compounds may be used alone or in combination so long as storage stability of the ink is not deteriorated.

Due to the high cohesive force of carbonate group, a polycarbonate polyurethane resin is preferable as the polyurethane resin in terms of water resistance, heat resistance, wear resistance, weather resistance, and image scratch resistance. The polycarbonate polyurethane resin makes it possible to obtain ink suitable for a recording material for use in an extreme environment such as the outdoors.

Commercially available products may be used as the polyurethane resin. Specific examples of commercially-available products of the polyurethane resin include, but are not limited to, UCOAT UX-485 (polycarbonate-based polyurethane resin), UCOAT UWS-145 (polyester-based polyurethane resin), PERMARIN UA-368T (polycarbonate-based polyurethane resin), and PERMARIN UA-200 (polyether-based polyurethane resin), all products available from Sanyo Chemical Industries, Ltd. These polyurethane resins may be used alone or in combination.

The proportion of the resin contained in the clear ink is preferably 8.0% by mass or greater, and more preferably 8.0% by mass or greater but 25.0% by mass or less. When the proportion of the resin is 8.0% by mass or greater, the gloss can be controlled from matte tones to glossy tones with a small amount of the clear ink. When the amount of the resin is 25.0% by mass or less, good ink discharge stability is provided, which is preferable.

The matte gloss is achieved by forming isolated dots having a high pile height (height of the dot spheres) to impart an unevenness to the surface.

It is preferable that the amount of resin in the clear ink is large, because the dots having a high pile height are easily formed and the matte gloss is easily imparted.

On the other hand, the glossy gloss is imparted by filling the unevenness of the surface with the clear ink to form a smooth surface. In filling the unevenness of the surface with the clear ink, it is preferable that the amount of the resin in the clear ink is as large as possible for filling the unevenness of the surface and imparting a glossy gloss with a small amount of the clear ink.

Surfactant

The clear ink preferably contains a surfactant.

By adding a surfactant to the ink, the surface tension is reduced, and the permeation into the recording medium after the ink droplets landed on a recording medium such as paper becomes faster, and thus, feathering and color bleeding can be reduced.

Surfactants are classified as nonionic, anionic, or amphoteric depending on the polarity of the hydrophilic group.

Further, depending on the structure of the hydrophobic group, surfactants are classified into fluorine-based, silicone-based, acetylene-based, etc. In the present disclosure, a fluorine-based surfactant is mainly used, optionally in combination with a silicone-based surfactant and/or an acetylene-based surfactant.

The proportion of the surfactant is preferably 2.0% by mass or less, more preferably 0.05% by mass or more but 2.0% by mass or less, and particularly preferably 0.1% by mass or more but 2.0% by mass or less, relative to the total amount of the clear ink. When the proportion of the surfactant is 2.0% by mass or less, the glossiness is greatly reduced in the matte gloss printing mode.

Any of silicone-based surfactants, fluorine-based surfactants, amphoteric surfactants, nonionic surfactants, and anionic surfactant can be used as the surfactant.

The silicone-based surfactant is not particularly limited and may be appropriately selected depending on the intended purpose. Among the silicone-based surfactants, a silicone-based surfactant that is not decomposed at a high pH is preferable. Examples of such a surfactant include side-chain-modified polydimethyl siloxane, both-end-modified polydimethylsiloxane, one-end-modified polydimethyl siloxane, and side-chain-both-end-modified polydimethylsiloxane. The silicone-based surfactant including a polyoxyethylene group or a polyoxyethylene polyoxypropylene group as a modifying group is particularly preferable because the surfactant exhibits good characteristics as a water-based surfactant. Further, a polyether-modified silicone-based surfactant can also be used as the silicone-based surfactant, and an example thereof include a compound in which a polyalkyleneoxide structure is introduced to a side chain of the Si site of dimethylsiloxane.

Examples of the fluorine-based surfactant include, but are not limited to, perfluoroalkyl sulfonic acid compounds, perfluoroalkyl carboxylic acid compounds, perfluoroalkyl phosphoric acid ester compounds, perfluoroalkyl ethylene oxide adducts, and polyoxyalkylene ether polymer compounds having a perfluoroalkyl ether group in a side chain are particularly preferable because the foamability is low. Examples of the perfluoroalkyl sulfonic acid compound include, but are not limited to, perfluoroalkyl sulfonic acid and perfluoroalkyl sulfonic acid salt. Examples of the perfluoroalkyl carboxylic acid compound include, but are not limited to, perfluoroalkyl carboxylic acid and perfluoroalkyl carboxylic acid salt. Examples of the polyoxyalkylene ether polymer compound having a perfluoroalkyl ether group in a side chain include, but are not limited to, sulfuric acid ester salts of polyoxyalkylene ether polymer having a perfluoroalkyl ether group in a side chain thereof and salts of polyoxyalkylene ether polymer having a perfluoroalkyl ether group in a side chain thereof. Examples of counter ions of salts in these fluorine-based surfactants include Li, Na, K, $NH_4$, $NH_3CH_2CH_2OH$, $NH_2(CH_2CH_2OH)_2$, and $NH(CH_2CH_2OH)_3$.

Examples of the amphoteric surfactants include, but are not limited to, lauryl aminopropionic acid salts, lauryl dimethyl betaine, stearyl dimethyl betaine, and lauryl dihydroxyethyl betaine.

Examples of the nonionic surfactants include, but are not limited to, polyoxyethylene alkyl phenyl ether, polyoxyethylene alkyl ester, polyoxyethylene alkyl amine, polyoxyethylene alkyl amide, polyoxyethylene propylene block polymer, sorbitan fatty acid ester, polyoxyethylene sorbitan fatty acid ester, and ethylene oxide adduct of acetylene alcohol.

Examples of the anionic surfactants include, but are not limited to, polyoxyethylene alkyl ether acetic acid salt, dodecyl benzene sulfonic acid salt, lauryl acid salt, and a salt of polyoxyethylene alkyl ether sulfate.

These surfactants may be used alone or in combination.

The silicone-based surfactant is not particularly limited and may be appropriately selected in accordance with the purpose. Examples of the silicone-based surfactant include, but are not limited to, side-chain-modified polydimethyl siloxane, both-end-modified polydimethylsiloxane, one-end-modified polydimethylsiloxane, and side-chain-both-end-modified polydimethylsiloxane. Among these silicone-based surfactants, a polyether-modified silicone-based surfactant including a polyoxyethylene group and polyoxyethylene polyoxypropylene group as modifying groups is specifically preferable because such a surfactant exhibits good properties as a water-based surfactant.

These surfactants may be an appropriately synthesized product or a commercially available product. Commercial products of the silicone-based surfactants are available from BYL Japan K. K., Shin-Etsu Chemical Co., Ltd, Dow Corning Toray Co., Ltd., Nihon Emulsion Co., Ltd., Kyoeisha Chemical Co., Ltd., etc.

The aforementioned polyether-modified silicone-based surfactant is not particularly limited and may be appropriately selected depending on the intended purpose. An example of the polyether-modified silicone-based surfactant includes the compound represented by the following General Formula (S-1) in which a polyalkylene oxide structure was introduced into the side chain of an Si site of dimethylpolysiloxane.

General Formula (S-1)

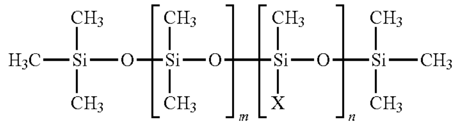

$X = —R(C_2H_4O)_a(C_3H_6O)_bR'$

In the above General Formula (S-1), each of m, n, a, and b independently represents an integer, and R represents an alkylene group, and R' represents an alkyl group.

Specific examples of commercially-available products of the polyether-modified silicone-based surfactants include, but are not limited to: KF-618, KF-642, and KF-643 (available from Shin-Etsu Chemical Co., Ltd.); EMALEX-SS-5602 and SS-1906EX (available from Nihon Emulsion Co., Ltd.); FZ-2105, FZ-2118, FZ-2154, FZ-2161, FZ-2162, FZ-2163, and FZ-2164 (available from Dow Corning Toray Co., Ltd); BYK-33 and BYK-387 (available from BYK Japan KK); and TSF4440, TSF4452, and TSF4453 (available from Momentive Performance Materials Inc.).

Preferably, the fluorine-based surfactant is a compound having 2 to 16 fluorine-substituted carbon atoms, more preferably a compound having 4 to 16 fluorine-substituted carbon atoms.

Examples of the fluorine-based surfactant include, but are not limited to, perfluoroalkyl phosphoric acid ester compounds, perfluoroalkyl ethylene oxide adducts, and polyoxyalkylene ether polymer compounds each having a perfluoroalkyl ether group in a side chain. Among these fluorine-based surfactants, polyoxyalkylene ether polymer compounds each having a perfluoroalkyl ether group in a side chain are preferable for their low foamability, and the fluorine-based surfactants represented by the following General Formula (F-1) and General Formula (F-2) are specifically preferable.

General Formula (F-1)

$$CF_3CF_2(CF_2CF_2)_m—CH_2CH_2O(CH_2CH_2O)_nH$$

In the compound represented by the aforementioned General Formula (F-1), m is preferably an integer of 0 or greater but 10 or less, and n is preferably an integer of 0 or greater but 40 or less, for imparting water solubility.

General Formula (F-2)

$$C_nF_{2n+1}—CH_2CH(OH)CH_2—O—(CH_2CH_2O)_a—Y$$

In the compound represented by the aforementioned General Formula (F-2), Y is H, or $C_nF_{2m+1}$ (m being an integer within the range of 1 to 6), or $CH_2CH(OH)CH_2—C_mF_{2m+1}$ (m being an integer of 4, 5 or 6), or $C_pH_{2p+1}$ (p being an integer within the range of 1 to 19). Further, n is an integer within the range of 1 to 6, and a is an integer within the range of 4 to 14.

Commercially available products may be used as the fluorine-based surfactant. Specific examples of commercially-available fluorine-based surfactants include, but are not limited to: SURFLON S-111, S-112, S-113, S-121, S-131, S-132, S-141, and S-145 (available from Asahi Glass Co., Ltd.); Fluorad™ FC-93, FC-95, FC-98, FC-129, FC-135, FC-170C, FC-430, and FC-431 (available from 3M Japan Limited); MEGAFACE F-470, F-1405, and F-474 (available from DIC Corporation); Zonyl® TBS, FSP, FSA, FSN-100, FSN, FSO-100, FSO, FS-300, UR, CAPSTONE FS-30, FS-31, FS-3100, FS-34, and FS-35 (available from The Chemours Company); FT-110, FT-250, FT-251, FT-400S, FT-150, and FT-400SW (available from NEOS COMPANY LIMITED); PolyFox PF-136A, PF-156A, PF-151N, PF-154, and PF-159 (available from OMNOVA Solutions Inc.); and UNIDYNE™ DSN-403N (available from Daikin Industries, Ltd.). Among these, for improving printing quality, in particular color developing property, paper permeability, paper wettability, and uniform dying property, FS-3100, FS-34, and FS-300 (available from The Chemours Company), FT-110, FT-250, FT-251, FT-400S, FT-150, and FT-400SW (available from NEOS COMPANY LIMITED), PolyFox PF-151N (available from OMNOVA Solutions Inc.), and UNIDYNE™ DSN-403N (available from Daikin Industries, Ltd.) are particularly preferred.

The clear ink may further contain other components such as a defoamer, a preservative, a fungicide, a corrosion inhibitor, and/or a pH adjuster, as necessary.

Defoamer

The defoamer is not particularly limited, and examples of the defoamer include, but are not limited to, silicone-based defoamers, polyether-based defoamers, and fatty acid ester-based defoamers. These can be used alone or in combination. Among these defoamers, silicone-based defoamers are preferred for the foam braking effect.

Preservative and Fungicide

The preservative and fungicide are not particularly limited, and examples thereof include, but are not limited to, 1,2-benzisothiazolin-3-one.

Corrosion Inhibitor

The corrosion inhibitor is not particularly limited, and examples thereof include, but are not limited to, acid sulfite and sodium thiosulfate. pH Adjuster The pH adjuster is not particularly limited as long as it is capable of adjusting the pH to 7 or higher. Specific examples thereof include, but are not limited to, amines such as diethanolamine and triethanolamine.

The properties of the ink are not particularly limited and can be suitably selected to suit to a particular application. As an example, preferred viscosity, surface tension, and pH of the ink are described below.

Preferably, the viscosity of the clear ink at 25° C. is from 5 to 30 mPa·s, more preferably from 5 to 25 mPa·s, for improving print density and text quality and enhancing dischargeability. The viscosity can be measured at 25° C. by a rotatory viscometer (RE-80L available from Toki Sangyo Co., Ltd.) equipped with a standard cone rotor (1° 34'× R24), while setting the sample liquid amount to 1.2 mL, the number of rotations to 50 rotations per minute (rpm), and the measuring time to 3 minutes.

The surface tension of the clear ink is preferably 35 mN/m or less and more preferably 32 mN/m or less at 25° C. in terms that the ink is suitably leveled on a recording medium and the drying time of the ink is shortened.

The pH of the clear ink is preferably from 7 to 12 and more preferably from 8 to 11 in terms of the prevention of corrosion of the metal materials contacting the ink.

Printing Material

The printing material is not limited to that which can be used as a recording medium, and building materials, such as wall paper, flooring materials, and tiles, cloth for clothing such as T-shirts, textiles, leather, etc. can be appropriately used. In addition, ceramics, glass, and metal can also be used as the printing material by adjusting the structure of a path for transporting the printing material.

The recording medium is not particularly limited. For example, plain paper, gloss paper, special paper, and cloth can be used. Also, impermeable substrates can be used to form good quality images.

The impermeable substrate is a substrate having a surface whose moisture permeability and absorptivity are low, and includes a material that may have a number of internal cavities which are not open to the outside. More qualitatively, the impermeable substrate means a substrate having a water absorption amount of 10 mL/$m^2$ or less from the initial contact to 30 $msec^{1/2}$ according to the Bristow method.

Examples of the impermeable substrate include, but are not limited to, plastic films such as polyvinyl chloride films, polyethylene terephthalate (PET) films, acrylic resin films, polypropylene films, polyethylene films and polycarbonate films.

In the present disclosure, it is preferable to use a printing material having a high glossiness in the matte gloss printing mode. The printing material having a high glossiness is preferable in terms that the matte gloss effect is easily emphasized by the clear ink.

On the other hand, it is preferable to use a printing material having a low glossiness in the glossy gloss printing mode. The printing material having a low glossiness is preferable in terms that the glossy gloss effect is easily emphasized by the clear ink.

Therefore, when the glossiness of the printing material used in the matte gloss printing mode is denoted as $G_{matte}$ and the glossiness of the printing material used in the glossy gloss printing mode is denoted as $G_{gloss}$, the following formula, $G_{matte}>G_{gloss}$ is preferably satisfied, and more preferably, the following formula, $G_{matte}-G_{gloss}\geq 100$ is satisfied.

Method for Controlling Glossiness of Printed Image

A method for controlling the glossiness of a printed image according to the present disclosure includes:

a printing step in which an ink is discharged to a printing material to provide a printed layer;

a heating step in which the printing material having the printed layer thereon is heated by a heater; and a cleaning step in which a nozzle formation surface of a discharge head is wiped with a wiper.

The ink is a clear ink containing a resin.

The method for controlling the glossiness of a printed image has a matte gloss printing mode which imparts a matte gloss and a glossy gloss printing mode which imparts a glossy gloss.

The temperature of the heater is controlled to be high during printing by the matte gloss printing mode, and the temperature of the heater is controlled to be low during printing by the glossy gloss printing mode.

Printed Matter

The printed matter according to the present disclosure includes the printing material and a printed layer on the printing material.

The printed layer comprises a clear ink layer containing a resin.

The printed matter has a matte printed image that is printed in a matte gloss printing mode, and a glossy printed image that is printed in a glossy gloss printing mode.

A glossiness difference (Ga−Gb) between a 60° glossiness Ga of the glossy printed image and a 60° glossiness Gb of the printing material used in the glossy gloss printing mode is 20 or more.

A glossiness difference (Gc−Gd) between a 60° glossiness Gc of the matte printed image and a 60° glossiness Gd of the printing material used in the matte gloss printing mode is −20 or less.

The printed matter can be formed by forming an image by the ink-jet printer and the ink-j et printing method.

Recording Device and Recording Method

In the following description of the recording device and the printing method, the cases when a black (K) ink, a cyan (C) ink, a magenta (M) ink, and a yellow (Y) ink were used are described, but a clear ink can be used in place of these inks, or, in addition to these inks.

The clear ink used in the present disclosure can be suitably used in various recording devices according to an ink-jet printing system, such as printers, facsimile machines, photocopiers, printer/fax/copier multifunction peripherals, and 3D model manufacturing devices.

The ink-jet printer is not specifically limited. The ink-jet printer includes both a serial type device in which a discharging head is caused to move and a line type device in which the discharging head is not moved.

Furthermore, in addition to the desktop type, the ink-j et printer includes a large-width recording device, and, for example, a continuous printer capable of using a continuous sheet wound up in a roll as a recording medium.

In the present disclosure, the recording device represents a device capable of discharging ink and various processing fluids, etc. to a recording medium, and the recording method represents a method for printing using the device. The recording medium represents a medium to which ink and various processing fluids, etc., may be adhered at least temporarily.

The recording device includes not only the head portion for discharging the ink, but also a device associated with the feeding, transferring, and ejecting of the recording medium, and other devices referred to as a pre-processing device, a post-processing device, etc.

Further, the recording device and the recording method are not limited to those producing significant visible images, such as text and figures with the ink. The recording device and the recording method can produce patterns such as geometric designs and 3D images.

The recording device is not specifically limited. The recording device includes both a serial type device in which a discharging head is caused to move and a line type device in which the discharging head is not moved.

Furthermore, in addition to the desktop type, the recording device includes a large-width recording device capable of printing an image on an A0-size recording medium. An example of the large-width recording device includes a continuous printer capable of using a continuous sheet wound up in a roll as a recording medium.

Figure 2:
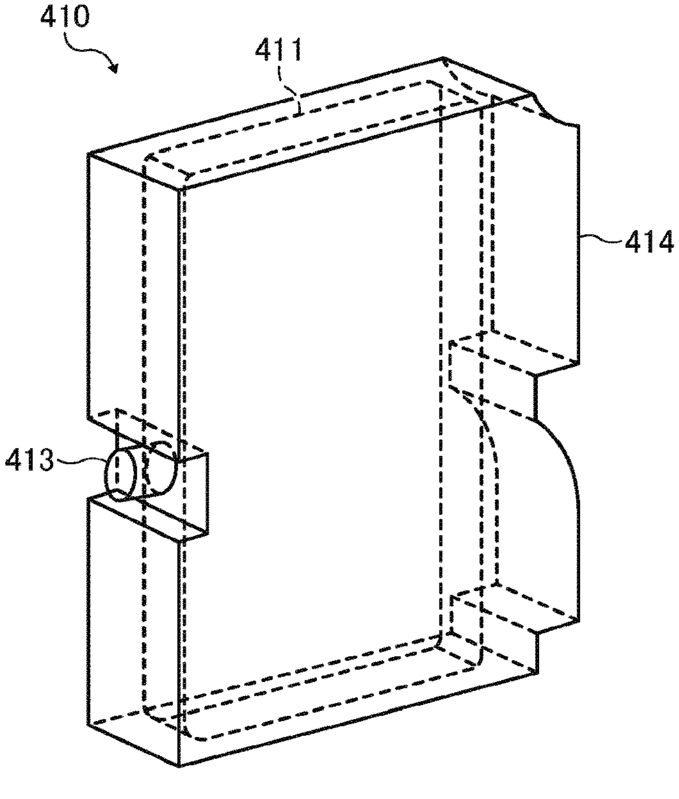
FIG. 2 is a perspective view illustrating a main tank of the image forming apparatus illustrated in FIG. 1.

An example of the recording device is described below with reference to FIG. 1 and FIG. 2. FIG. 1 is a perspective view of the recording device. FIG. 2 is a perspective view of a main tank. As an example of the recording device, an image forming apparatus 400 is a serial type image forming apparatus. A mechanical unit 420 is provided in an exterior 401 of the image forming apparatus 400. Each ink container 411 of main tanks 410 (410*k*, 410*c*, 410*m*, 410*y*) for each color of black (K), cyan (C), magenta (M), and yellow (Y) is made of a packing member such as an aluminum laminate film. The ink container 411 is accommodated, for example, in a plastic housing container case 414. As a result, the main tank 410 is used as an ink cartridge of each color.

The recording device is provided with a cartridge holder 404 on the rear side of the opening when a cover of the device main body 401*c* is opened. The main tank 410 is detachably mounted in the cartridge holder 404. As a result, the recording device communicates each ink discharge outlet 413 of the main tank 410 to a discharge head 434 for each color via a supply tube 436 for each color, so that the ink can be discharged from the discharge head 434 to the recording medium.

The recording device may include not only a portion for discharging ink but also a device referred to as a pre-processing device, a post-processing device, etc.

As an embodiment of the pre-processing device and the post-processing device, there is an embodiment in which a liquid container including a pre-processing fluid or a post-processing fluid and a liquid discharging head are added and the pre-processing fluid or the post-processing fluid are discharged in ink-jet recording system in the same manner as the cases of the black (K), cyan (C), magenta (M), and yellow (Y) inks.

As another embodiment of the pre-processing device and the post-processing device, there is an embodiment in which the pre-processing device and the post-processing device employing a blade coating method, a roll coating method, or a spray coating method, other than the ink-jet recording system.

The usage method of the ink is not limited to the ink-jet recording method, and the ink can be widely used. Examples other than the ink-jet recording method include blade coating method, gravure coating method, bar coating method, roll the coating method, dip coating method, curtain coating method, slide coating method, die coating method, and spray coating method.

The application of the ink is not particularly limited and may be appropriately selected depending on the intended purpose. The ink can be applied to, for example, prints, paints, coating materials, base materials, etc. Furthermore, the ink can be used not only to form two-dimensional texts and images, but also can be used as a three-dimensional object forming material to form a three-dimensional object.

A known three-dimensional object formation device for forming a three-dimensional object can be used and is not specifically limited. For example, it is possible to use a three-dimensional object manufacturing device provided with a storage, a supplying device, a discharging device, and a dryer for the ink. The three-dimensional object can be obtained by overcoating the ink. Further, the three-dimensional object can also include a formed article obtained by processing the structure to which the ink was imparted on a substrate such as the recording medium. The formed article is formed, for example, by subjecting a recording material or a structure formed to a sheet or film to a formation processing such as heat-drawing and punching, and, is suitable for use in applications for forming a surface after decoration, for example, meters and operation panels of automotive vehicles, office machines, electric and electronic machines, and cameras.

Further, among the terms of the present disclosure, terms such as image forming, recording, letter printing, and printing are considered to be synonyms.

Terms such as recording medium, media, and the printing material are considered to be synonyms.

EXAMPLES

The examples of the present disclosure will be described below, but the present disclosure is not limited to these examples.

Preparation Example 1

Preparation of Polycarbonate Polyurethane Resin Emulsion 1

A reaction vessel equipped with a stirrer, a reflux condenser, and a thermometer was charged with 1,500 parts by mass of polycarbonate diol (reaction product of 1,6-hexanediol and dimethyl carbonate (number average molecular weight (Mn): 1,200), 220 parts by mass of 2,2-dimethylol propionic acid (hereinafter, referred to as “DMPA”), and 1,347 parts by mass of N-methylpyrrolidone (hereinafter, referred to as “NMP”) under a nitrogen gas stream, followed by heating to 60° C. to dissolve the DMPA.

Next, 1,445 parts by mass of 4,4'-dicyclohexylmethane diisocyanate and 2.6 parts by mass of dibutyl tin dilaurate (catalyst) were added to the resultant, followed by heating to 90° C., and a urethane reaction was performed for 5 hours, to obtain an isocyanate-terminated urethane prepolymer. The reaction mixture was cooled to 80° C., 149 parts by mass of triethylamine was added and mixed together, and 4,340 parts by mass of the resultant mixture was removed, and added to a mixed solution of 5,400 parts by mass of water and 15 parts by mass of triethylamine under strong stirring.

Next, 1,500 parts by mass of ice and 626 parts by mass of a 35% by mass aqueous solution of 2-methyl-1,5-pentanediamine were added to perform a chain elongation reaction. The solvents were distilled off so as to make a solid content of 30% by mass, to obtain Polycarbonate polyurethane resin emulsion 1.

The obtained polycarbonate polyurethane resin emulsion was measured with “a filming temperature tester” (manufactured by Imoto Machinery Co., Ltd.). The minimum filing temperature was 55° C.

Preparation Example 2

Preparation of Acrylic Resin Emulsion 1

A reaction vessel equipped with a stirrer, a reflux condenser, a dropping apparatus, and a thermometer was charged with 900 parts by mass of ion-exchanged water and 1 part by mass of sodium lauryl sulfate, and the temperature was raised to 70° C. while purging with nitrogen while stirring. While maintaining the internal temperature at 70°

C., 4 parts by mass of potassium persulfate was added as a polymerization initiator, and after dissolving, an emulsion prepared in advance by adding 450 parts by mass of ion-exchanged water, 3 parts by mass of sodium lauryl sulfate, 20 parts by mass of acrylamide, 365 parts by mass of styrene, 545 parts by mass of butyl acrylate, and 10 parts by mass of methacrylic acid while stirring was continuously dropped over four hours into the reaction solution. After completing the dripping, the resultant mixture was held for three hours. After the obtained aqueous emulsion was cooled to room temperature, ion-exchanged water and sodium hydroxide aqueous solution were added and adjusted to a pH of 8, to obtain Acrylic resin emulsion 1 (solid content: 30% by mass).

Production Example 1

Production of Clear Ink A

First, 25% by mass of Polyurethane resin emulsion 1 (solid content 30% by mass) of Preparation Example 1, 19% by mass of 1,2-propanediol, 1% by mass of 1,3-propanediol 1, 3% by mass of 1,2-butanediol, and 6% by mass of product name "FS-300" (manufactured by DuPont de Nemours, Inc., fluorine-based surfactant, solid content 40% by mass) as the surfactant were added with 36% by mass of highly pure water, mixed and stirred to prepare a mixture.

Next, Clear ink A was produced by subjecting the obtained mixture to filtration through a polypropylene filter (product name: Betafine polypropylene pleated filter PPG series, manufactured by 3M Japan Limited) having an average pore diameter of 0.2 μm.

Production Examples 2 to 6

Production of Clear Inks B to F

In Production Examples 2 to 6, clear inks B to F were produced in the same manner as Production Example 1 with the exception of changing the ink composition to the ink compositions illustrated in Table 1.

Production Example 7

Production of Magenta Ink

Preparation of Self-Dispersible Magenta Pigment Dispersion

The following prescription mixture was premixed and subjected to circulation with a disk-type bead mill (manufactured by Shinmaru Enterprises Corporation, KDL Type, media used: zirconia balls having a diameter of 0.3 mm) for 7 hours to obtain a self-dispersible magenta pigment dispersion (pigment solid content: 15% by mass).

Pigment red 122 (product name: Toner Magenta EO02, manufactured by Clariant (Japan) K. K.) . . . 15 parts by mass Anionic surfactant (Pionine A-51-B manufactured by Takemoto Oil & Fat Co., Ltd.) . . . 2 parts by mass Ion-exchanged water . . . 83 parts by mass

Preparation of Magenta Ink

First, 25% by mass of Polyurethane resin emulsion 1 (solid content 30% by mass) of Preparation Example 1, 20% by mass of the self-dispersible magenta pigment dispersion (pigment solid content: 15% by mass), 20% by mass of 1,2-propanediol, 11% by mass of 1,3-propanediol, 3% by mass of 1,2-butanediol, and 6% by mass of product name "FS-300" (manufactured by DuPont de Nemours, Inc., fluorine-based surfactant, solid content: 40% by mass) as the surfactant were added with 15% by mass of highly pure water, mixed and stirred to prepare a mixture.

Next, the magenta ink was produced by subjecting the obtained mixture to filtration through a polypropylene filter (product name: Betafine polypropylene pleated filter PPG series, manufactured by 3M Japan Limited) having an average pore diameter of 0.2 μm.

Wiper Production Examples 1 to 31

Production of Wipers Nos. 1 to 31

The sheet-like nonwoven fabrics consisting of the materials illustrated in Table 2 were prepared. The wipers were produced by pasting the sheet-like nonwoven fabrics as the

TABLE 1

| | | Production Example 1 Water-based clear ink A | Production Example 2 Water-based clear ink B | Production Example 3 Water-based clear ink C | Production Example 4 Water-based clear ink D | Production Example 5 Water-based clear ink E | Production Example 6 Solvent-based clear ink F |
|---|---|---|---|---|---|---|---|
| Resin | Polyurethane resin emulsion 1 (water dispersible, solid content: 30% by mass) | 25 | 30 | 30 | 40 | — | 25 |
| | Acrylic resin emulsion 1 (water dispersible, solid content: 30% by mass) | — | — | — | — | 40 | — |
| Water | Highly pure water | 36 | 32.6 | 33.5 | 26.5 | 26.5 | — |
| Surfactant | FS-300 (manufactured by DuPont de Nemours, Inc.) (solid content: 40% by mass) | 6 | 6 | 4.5 | 4.5 | 4.5 | 6 |
| Organic solvent | 1,2-propanediol | 19 | 17.4 | 18 | 15 | 15 | 19 |
| | 1,3-propanediol | 11 | 11 | 11 | 11 | 11 | 11 |
| | 1,2-butanediol | 3 | 3 | 3 | 3 | 3 | 3 |
| | 1,2-hexanediol | — | — | — | — | — | 16 |
| | Diethylene glycol | — | — | — | — | — | 20 |
| Total (% by mass) | | 100 | 100 | 100 | 100 | 100 | 100 |
| Resin solid content: Content in clear ink (% by mass) | | 7.5 | 9 | 9 | 12 | 12 | 7.5 |

first layer and the second layer. Note that, the wiper 27 in Table 2 represents a single layer structure.

TABLE 2

| | Fiber used | | Thickness (mm) | | Porosity | |
|---|---|---|---|---|---|---|
| Wiper No. | First layer | Second layer | First layer | Second layer | First layer | Second layer |
| Wiper 1 | Polyester | Rayon | 0.06 | 0.25 | 0.58 | 0.80 |
| Wiper 2 | Polyester | Rayon | 0.06 | 0.25 | 0.60 | 0.80 |
| Wiper 3 | Polyester | Rayon | 0.06 | 0.25 | 0.74 | 0.80 |
| Wiper 4 | Polyester | Rayon | 0.06 | 0.25 | 0.74 | 0.80 |
| Wiper 5 | Polyester | Rayon | 0.06 | 0.25 | 0.80 | 0.80 |
| Wiper 6 | Polyester | Rayon | 0.06 | 0.25 | 0.81 | 0.82 |
| Wiper 7 | Polyester | Rayon | 0.06 | 0.25 | 0.85 | 0.87 |
| Wiper 8 | Polyester | Rayon | 0.06 | 0.25 | 0.88 | 0.90 |
| Wiper 9 | Polyester | Rayon | 0.06 | 0.25 | 0.58 | 0.99 |
| Wiper 10 | Polyester | Rayon | 0.06 | 0.25 | 0.60 | 0.99 |
| Wiper 11 | Polyester | Rayon | 0.06 | 0.25 | 0.74 | 0.99 |
| Wiper 12 | Polyester | Rayon | 0.06 | 0.25 | 0.75 | 0.99 |
| Wiper 13 | Polyester | Rayon | 0.06 | 0.25 | 0.80 | 0.99 |
| Wiper 14 | Polyester | Rayon | 0.06 | 0.25 | 0.81 | 0.99 |
| Wiper 15 | Polyester | Rayon | 0.06 | 0.25 | 0.85 | 0.99 |
| Wiper 16 | Polyester | Rayon | 0.06 | 0.25 | 0.88 | 0.99 |
| Wiper 17 | Polyester | Rayon | 0.06 | 0.25 | 0.60 | 0.78 |
| Wiper 18 | Polyester | Rayon | 0.06 | 0.25 | 74.00 | 0.78 |
| Wiper 19 | Polyester | Rayon | 0.06 | 0.25 | 0.75 | 0.78 |
| Wiper 20 | Polyester | Rayon | 0.06 | 0.25 | 0.77 | 0.88 |
| Wiper 21 | Polyester | Rayon | 0.12 | 0.50 | 0.75 | 0.80 |
| Wiper 22 | Polyester | Rayon | 0.05 | 0.10 | 0.75 | 0.80 |
| Wiper 23 | Polyolefin | Rayon + Polyolefin (mixing ratio 50:50) | 0.06 | 0.25 | 0.77 | 0.88 |
| Wiper 24 | Polyester | Polyolefin-based porous material | 0.06 | 0.50 | 0.77 | 0.88 |
| Wiper 25 | Polyester | Rayon (PET film backing) | 0.06 | 0.25 | 0.77 | 0.88 |
| Wiper 26 | Polyester | Rayon (two layers) | 0.06 | 0.2/ 0.12 | 0.77 | 0.82/ 0.95 |
| Wiper 27 | Polyester | — | 0.06 | — | 0.77 | — |
| Wiper 28 | Polyester | Rayon | 0.06 | 0.25 | 0.85 | 0.81 |
| Wiper 29 | Polyester | Rayon | 0.30 | 0.10 | 0.78 | 0.92 |
| Wiper 30 | Polyester | Rayon | 0.12 | 0.50 | 0.85 | 0.81 |
| Wiper 31 | Polyester | Rayon | 0.12 | 0.05 | 0.85 | 0.81 |

Example 1

Ink-jet Printing

A water-based clear ink A of Production Example 1 was filled in an ink cartridge of a modified device of the ink-jet printer GXe5500 (manufactured by Ricoh Company Limited). The ink cartridge filled with ink was mounted in a modified device of the ink-jet printer GXe5500 to perform the ink-jet printing.

The modified device of the ink-jet printer GXe5500 is provided with a heater (temperature adjustment controller, Model MTCD, manufactured by Misumi Corporation) in order to heat the recording medium from the back side before printing, during printing, and after printing. As a result, the modified device of the ink-jet printer GXe5500 may print on the recording medium heated by the heater before printing and during printing, and the printed matter can be heated and dried by the heater after printing.

Printing was performed in the glossy gloss printing mode and the matte gloss printing mode by changing the type of recording medium, the heating conditions, and the printed image by using the modified device of the ink-jet printer GXe5500.

Recording Medium

In the glossy gloss printing mode, a synthetic paper VJFN160 (white polypropylene film, glossiness 16 (60° gloss value)) manufactured by Yupo Corporation was used as Recording medium 1.

In the matte gloss printing mode, a window film GIY0305 (transparent polyethylene terephthalate (PET) film, glossiness 159 (60° gloss value)) manufactured by Lintec Corporation was used as Recording medium 2.

Heating Conditions

In the glossy gloss printing mode, the heating temperature of the heater before printing, during printing, and after printing was set to 60° C., 60° C., and 70° C., respectively.

In the matte gloss printing mode, the heating temperature of the heater before printing, during printing, and after printing was set to 65° C., 65° C., and 70° C., respectively. The temperature of the heater (=$T_{gloss}$) when printing in the glossy gloss printing mode was 60° C., and the temperature of the heater (=$T_{matte}$) when printing in the matte gloss printing mode was 65° C.

The temperature of the heater (=$T_{gloss}$) when printing in the glossy gloss printing mode is the same as the set temperature of the heater during printing (upper row in Table 3-3).

The temperature of the heater (=$T_{matte}$) when printing in the matte gloss printing mode is the same as the set temperature of the heater during printing (lower row in Table 3-3).

The image printed in the glossy gloss printing mode had an image resolution of 600 dpi×600 dpi and was a full solid image having a coverage of 100%.

The image printed in the matte gloss printing mode had an image resolution of 600 dpi×600 dpi and was a halftone image having a coverage of 40%.

Coverage

In the Examples, the coverage is defined by the following formula.

Coverage (%)=number of clear ink printed dots/(longitudinal resolution×lateral resolution)×100

In the formula, the "number of clear ink printed dots" represents the number of dots actually printed with the water-based clear A ink per unit area. The "vertical resolution" and the "horizontal resolution" refer to the respective resolutions per unit area. In a case in which the water-based clear ink A is overlappingly printed on the same dot position, the "number of clear ink printed dots" indicates the total number of dots actually printed with the water-based clear ink A per unit area.

In both of the matte gloss printing mode and the glossy gloss printing mode, printing was performed by applying the water-based clear ink A directly on the recording medium once so as to overlap the same dot position.

Next, the glossiness was measured for the obtained printed matter in the following manner. The results are illustrated in Table 3-3.

Glossiness Evaluation

The respective 60° gloss values of the clear ink printed part on which the water-based clear ink A was printed and the clear ink unprinted part (recording medium) on which the water-based clear ink A was not printed were measured using a gloss meter (Micro-tri gloss, manufactured by BYK Japan). The obtained glossiness difference was evaluated by the following criteria. Note that, the 60° gloss level was defined as the glossiness.

Evaluation Criteria

Good: the glossiness difference (Ga−Gb) with the 60° glossiness Gb was 20 or more, or the glossiness difference (Gc−Gd) with the 60° glossiness Gd was −20 or less Poor: the glossiness difference (Ga−Gb) with the 60° glossiness Gb was less than 20, or the glossiness difference (Gc−Gd) with the 60° glossiness Gd was more than −20

Wiping Test

An MH5440 (manufactured by Ricoh Company Limited) was used as the ink jet head and 0.1 mL of the water-based clear ink A was dropped on the nozzle plate of the ink jet head. Then, the nozzle plate was left standing for fifteen hours, and the nozzle plate with firmly adhering ink was produced.

The cleaner in the ink-jet printer illustrated in FIG. 5 was used, and the wiper 2 illustrated in Table 3-2 was used and 20 μL/cm$^2$ of the cleaning fluid having the following composition was applied to the wiper 2. Then, the nozzle plate surface was wiped. The conditions while wiping were made to a pressing force of 3N and a wiping speed of 50 mm/s.

Composition of the Cleaning Fluid 3-methoxy-3-methyl-1-butanol (manufactured by Kuraray Co., Ltd): 20% by mass Polyether modified silicone surfactant (product name: WET270, manufactured by Evonik Degussa Japan Co. Ltd.): 1% by mass Ion-exchanged water: balance Cleaning Property Evaluation The wiped nozzle plates were visually examined, the number of wipes by which the firmly-adhering ink was removed was determined, and cleaning property was evaluated by the following criteria. The results are shown in Table 3-3. Note that, by the following evaluation criteria, Fair or higher is regarded as satisfactory, Good is preferable, and Very good is specifically preferable.

Evaluation Criteria

Very good: the firmly-adhering ink on the nozzle plate was removed by cleaning five times or less Good: the firmly-adhering ink on the nozzle plate was removed by cleaning more than five times but ten times or less Fair: the amount of firmly-adhering ink on the nozzle plate was less than 50% of the initial amount Poor: the amount of firmly-adhering ink on the nozzle plate was 50% or more than the initial amount

Examples 2 to 7, Examples 9 to 39, and Comparative Examples 1 to 5

The printed matter was obtained in the same manner as in Example 1 with the exception that at least one of the “ink type”, the “printing mode”, the “recording medium”, the “printed image”, the “part to be printed with clear ink”, the “coverage”, the “number of times clear ink is overcoated”, the “wiper”, and the “set temperature of the heater” in Example 1 was changed as illustrated in Table 3-1, Table 3-2, Table 3-3, Table 4-1, Table 4-2, and Table 4-3. The obtained printed matters were evaluated in the same manner as Example 1. The results are shown in Table 3-3 and Table 4-3.

Example 8

The ink-jet printing was performed in the same manner as in Example 1 with the exception that a recording medium on which the magenta ink of Production Example 7 was printed was used. In other words, the magenta ink of Production Example 7 was printed on the recording medium. The clear ink E was printed on this magenta ink coating film. The magenta ink printed on the recording medium was the magenta ink of Production Example 7. The printing of only the magenta ink on the recording medium was performed by the same printer as the clear ink E. The magenta ink coating films used in the glossy gloss printing mode were printed by setting the heating temperature of the heater before printing, during printing, and after printing to 50° C., 50° C., and 70° C., respectively, and the magenta ink coating films used in the matte gloss printing mode were printed by setting the heating temperature of the heater before printing, during printing, and after printing to 70° C., 70° C., and 70° C., respectively. All of the printed images of the magenta ink were printed with an image resolution of 600 dpi×600 dpi and were full solid images having a coverage of 100%.

The clear ink E was again printed with the printer on the recording medium on which the magenta ink coating film was printed. The obtained printed matter was evaluated in the same manner as Example 1. The results are shown in Table 3-3.

TABLE 3-1

| | Ink type | Printing mode | Recording medium | Printed image |
|---|---|---|---|---|
| Example 1 | Clear ink A | Glossy gloss | VJFN160 | Full solid image |
| | | Matte gloss | GIY0305 | Halftone image |
| Example 2 | Clear ink A | Glossy gloss | VJFN160 | Full solid image |
| | | Matte gloss | GIY0305 | Halftone image |
| Example 3 | Clear ink A | Glossy gloss | VJFN160 | Full solid image |
| | | Matte gloss | GIY0305 | Halftone image |
| Example 4 | Clear ink B | Glossy gloss | VJFN160 | Full solid image |
| | | Matte gloss | GIY0305 | Halftone image |
| Example 5 | Clear ink C | Glossy gloss | VJFN160 | Full solid image |
| | | Matte gloss | GIY0305 | Halftone image |
| Example 6 | Clear ink D | Glossy gloss | VJFN160 | Full solid image |
| | | Matte gloss | GIY0305 | Halftone image |
| Example 7 | Clear ink E | Glossy gloss | VJFN160 | Full solid image |
| | | Matte gloss | GIY0305 | Halftone image |
| Example 8 | Clear ink E + magenta ink | Glossy gloss | VJFN160 | Full solid image |
| | | Matte gloss | GIY0305 | Halftone image |
| Example 9 | Clear ink A | Glossy gloss | VJFN160 | Full solid image |
| | | Matte gloss | GIY0305 | Halftone image |
| Example 10 | Clear ink A | Glossy gloss | VJFN160 | Full solid image |
| | | Matte gloss | GIY0305 | Halftone image |
| Example 11 | Clear ink A | Glossy gloss | VJFN160 | Full solid image |
| | | Matte gloss | GIY0305 | Halftone image |
| Example 12 | Clear ink A | Glossy gloss | VJFN160 | Full solid image |
| | | Matte gloss | GIY0305 | Halftone image |
| Example 13 | Clear ink A | Glossy gloss | VJFN160 | Full solid image |
| | | Matte gloss | GIY0305 | Halftone image |
| Example 14 | Clear ink A | Glossy gloss | VJFN160 | Full solid image |
| | | Matte gloss | GIY0305 | Halftone image |
| Example 15 | Clear ink A | Glossy gloss | VJFN160 | Full solid image |
| | | Matte gloss | GIY0305 | Halftone image |
| Example 16 | Clear ink A | Glossy gloss | VJFN160 | Full solid image |
| | | Matte gloss | GIY0305 | Halftone image |
| Example 17 | Clear ink A | Glossy gloss | VJFN160 | Full solid image |
| | | Matte gloss | GIY0305 | Halftone image |
| Example 18 | Clear ink A | Glossy gloss | VJFN160 | Full solid image |
| | | Matte gloss | GIY0305 | Halftone image |
| Example 19 | Clear ink A | Glossy gloss | VJFN160 | Full solid image |
| | | Matte gloss | GIY0305 | Halftone image |
| Example 20 | Clear ink A | Glossy gloss | VJFN160 | Full solid image |
| | | Matte gloss | GIY0305 | Halftone image |
| Example 21 | Clear ink A | Glossy gloss | VJFN160 | Full solid image |
| | | Matte gloss | GIY0305 | Halftone image |
| Example 22 | Clear ink A | Glossy gloss | VJFN160 | Full solid image |
| | | Matte gloss | GIY0305 | Halftone image |
| Example 23 | Clear ink A | Glossy gloss | VJFN160 | Full solid image |
| | | Matte gloss | GIY0305 | Halftone image |

TABLE 3-2

| | Part to be printed with clear ink | Coverage | | Number of times clear ink was overcoated | Wiper Present | Wiper Type |
|---|---|---|---|---|---|---|
| Example 1 | Recording medium | $D_{gloss}$<br>$D_{matte}$ | 100%<br>40% | 1 time | Y | Wiper 2 |
| Example 2 | Recording medium | $D_{gloss}$<br>$D_{matte}$ | 80%<br>70% | 1 time | Y | Wiper 2 |
| Example 3 | Recording medium | $D_{gloss}$<br>$D_{matte}$ | 100%<br>40% | 1 time | Y | Wiper 2 |
| Example 4 | Recording medium | $D_{gloss}$<br>$D_{matte}$ | 100%<br>40% | 1 time | Y | Wiper 2 |
| Example 5 | Recording medium | $D_{gloss}$<br>$D_{matte}$ | 100%<br>40% | 1 time | Y | Wiper 2 |
| Example 6 | Recording medium | $D_{gloss}$<br>$D_{matte}$ | 100%<br>40% | 1 time | Y | Wiper 2 |
| Example 7 | Recording medium | $D_{gloss}$<br>$D_{matte}$ | 100%<br>40% | 1 time | Y | Wiper 2 |
| Example 8 | Magenta ink coating film | $D_{gloss}$<br>$D_{matte}$ | 100%<br>40% | 1 time | Y | Wiper 2 |
| Example 9 | Recording medium | $D_{gloss}$<br>$D_{matte}$ | 100%<br>40% | 1 time | Y | Wiper 1 |
| Example 10 | Recording medium | $D_{gloss}$<br>$D_{matte}$ | 100%<br>40% | 1 time | Y | Wiper 3 |
| Example 11 | Recording medium | $D_{gloss}$<br>$D_{matte}$ | 100%<br>40% | 1 time | Y | Wiper 4 |
| Example 12 | Recording medium | $D_{gloss}$<br>$D_{matte}$ | 100%<br>40% | 1 time | Y | Wiper 5 |
| Example 13 | Recording medium | $D_{gloss}$<br>$D_{matte}$ | 100%<br>40% | 1 time | Y | Wiper 6 |
| Example 14 | Recording medium | $D_{gloss}$<br>$D_{matte}$ | 100%<br>40% | 1 time | Y | Wiper 7 |
| Example 15 | Recording medium | $D_{gloss}$<br>$D_{matte}$ | 100%<br>40% | 1 time | Y | Wiper 8 |
| Example 16 | Recording medium | $D_{gloss}$<br>$D_{matte}$ | 100%<br>40% | 1 time | Y | Wiper 9 |
| Example 17 | Recording medium | $D_{gloss}$<br>$D_{matte}$ | 100%<br>40% | 1 time | Y | Wiper 10 |
| Example 18 | Recording medium | $D_{gloss}$<br>$D_{matte}$ | 100%<br>40% | 1 time | Y | Wiper 11 |
| Example 19 | Recording medium | $D_{gloss}$<br>$D_{matte}$ | 100%<br>40% | 1 time | Y | Wiper 12 |
| Example 20 | Recording medium | $D_{gloss}$<br>$D_{matte}$ | 100%<br>40% | 1 time | Y | Wiper 13 |
| Example 21 | Recording medium | $D_{gloss}$<br>$D_{matte}$ | 100%<br>40% | 1 time | Y | Wiper 14 |
| Example 22 | Recording medium | $D_{gloss}$<br>$D_{matte}$ | 100%<br>40% | 1 time | Y | Wiper 15 |
| Example 23 | Recording medium | $D_{gloss}$<br>$D_{matte}$ | 100%<br>40% | 1 time | Y | Wiper 16 |

TABLE 3-3

| | Heater setting temperature | | | Glossiness evaluation | | Cleaning |
|---|---|---|---|---|---|---|
| | Before printing | During printing | After printing | Glossiness difference | Evaluation | property evaluation |
| Example 1 | 60° C. | 60° C. | 70° C. | 41 | Good | Good |
| | 65° C. | 65° C. | 70° C. | −49 | Good | Good |
| Example 2 | 60° C. | 60° C. | 70° C. | 24 | Good | Good |
| | 65° C. | 65° C. | 70° C. | −39 | Good | Good |
| Example 3 | 50° C. | 50° C. | 70° C. | 49 | Good | Good |
| | 70° C. | 70° C. | 70° C. | −57 | Good | Good |
| Example 4 | 50° C. | 50° C. | 70° C. | 52 | Good | Good |
| | 70° C. | 70° C. | 70° C. | −64 | Good | Good |
| Example 5 | 50° C. | 50° C. | 70° C. | 50 | Good | Good |
| | 70° C. | 70° C. | 70° C. | −75 | Good | Good |
| Example 6 | 50° C. | 50° C. | 70° C. | 54 | Good | Good |
| | 70° C. | 70° C. | 70° C. | −82 | Good | Good |
| Example 7 | 50° C. | 50° C. | 70° C. | 55 | Good | Good |
| | 70° C. | 70° C. | 70° C. | −77 | Good | Good |
| Example 8 | 50° C. | 50° C. | 70° C. | 55 | Good | Good |
| | 70° C. | 70° C. | 70° C. | −64 | Good | Good |
| Example 9 | 60° C. | 60° C. | 70° C. | 41 | Good | Fair |
| | 65° C. | 65° C. | 70° C. | −49 | Good | Fair |

TABLE 3-3-continued

| | Heater setting temperature | | | Glossiness evaluation | | Cleaning |
|---|---|---|---|---|---|---|
| | Before printing | During printing | After printing | Glossiness difference | Evaluation | property evaluation |
| Example 10 | 60° C. | 60° C. | 70° C. | 41 | Good | Good |
| | 65° C. | 65° C. | 70° C. | −49 | Good | Good |
| Example 11 | 60° C. | 60° C. | 70° C. | 41 | Good | Very good |
| | 65° C. | 65° C. | 70° C. | −49 | Good | Very good |
| Example 12 | 60° C. | 60° C. | 70° C. | 41 | Good | Very good |
| | 65° C. | 65° C. | 70° C. | −49 | Good | Very good |
| Example 13 | 60° C. | 60° C. | 70° C. | 41 | Good | Good |
| | 65° C. | 65° C. | 70° C. | −49 | Good | Good |
| Example 14 | 60° C. | 60° C. | 70° C. | 41 | Good | Good |
| | 65° C. | 65° C. | 70° C. | −49 | Good | Good |
| Example 15 | 60° C. | 60° C. | 70° C. | 41 | Good | Fair |
| | 65° C. | 65° C. | 70° C. | −49 | Good | Fair |
| Example 16 | 60° C. | 60° C. | 70° C. | 41 | Good | Fair |
| | 65° C. | 65° C. | 70° C. | −49 | Good | Fair |
| Example 17 | 60° C. | 60° C. | 70° C. | 41 | Good | Good |
| | 65° C. | 65° C. | 70° C. | −49 | Good | Good |
| Example 18 | 60° C. | 60° C. | 70° C. | 41 | Good | Good |
| | 65° C. | 65° C. | 70° C. | −49 | Good | Good |
| Example 19 | 60° C. | 60° C. | 70° C. | 41 | Good | Very good |
| | 65° C. | 65° C. | 70° C. | −49 | Good | Very good |
| Example 20 | 60° C. | 60° C. | 70° C. | 41 | Good | Very good |
| | 65° C. | 65° C. | 70° C. | −49 | Good | Very good |
| Example 21 | 60° C. | 60° C. | 70° C. | 41 | Good | Good |
| | 65° C. | 65° C. | 70° C. | −49 | Good | Good |
| Example 22 | 60° C. | 60° C. | 70° C. | 41 | Good | Good |
| | 65° C. | 65° C. | 70° C. | −49 | Good | Good |
| Example 23 | 60° C. | 60° C. | 70° C. | 41 | Good | Fair |
| | 65° C. | 65° C. | 70° C. | −49 | Good | Fair |

*In Table 3-3, the temperature of the heater (=$T_{gloss}$) when printing in the glossy gloss printing mode is the same as the set temperature of the heater during printing (upper row in Table 3-3). The temperature of the heater (=$T_{matte}$) when printing in the matte gloss printing mode is the same as the set temperature of the heater during printing (lower row in Table 3-3).

In Table 3-3, the temperature of the heater (=$T_{gloss}$) when printing in the glossy gloss printing mode is the same as the set temperature of the heater during printing (upper row in Table 3-3). The temperature of the heater (=$T_{matte}$) when printing in the matte gloss printing mode is the same as the set temperature of the heater during printing (lower row in Table 3-3).

TABLE 4-1

| | Ink type | Printing mode | Recording medium | Printed image |
|---|---|---|---|---|
| Example 24 | Clear ink A | Glossy gloss | VJFN160 | Full solid image |
| | | Matte gloss | GIY0305 | Halftone image |
| Example 25 | Clear ink A | Glossy gloss | VJFN160 | Full solid image |
| | | Matte gloss | GIY0305 | Halftone image |
| Example 26 | Clear ink A | Glossy gloss | VJFN160 | Full solid image |
| | | Matte gloss | GIY0305 | Halftone image |
| Example 27 | Clear ink A | Glossy gloss | VJFN160 | Full solid image |
| | | Matte gloss | GIY0305 | Halftone image |
| Example 28 | Clear ink A | Glossy gloss | VJFN160 | Full solid image |
| | | Matte gloss | GIY0305 | Halftone image |
| Example 29 | Clear ink A | Glossy gloss | VJFN160 | Full solid image |
| | | Matte gloss | GIY0305 | Halftone image |
| Example 30 | Clear ink A | Glossy gloss | VJFN160 | Full solid image |
| | | Matte gloss | GIY0305 | Halftone image |
| Example 31 | Clear ink A | Glossy gloss | VJFN160 | Full solid image |
| | | Matte gloss | GIY0305 | Halftone image |
| Example 32 | Clear ink A | Glossy gloss | VJFN160 | Full solid image |
| | | Matte gloss | GIY0305 | Halftone image |
| Example 33 | Clear ink A | Glossy gloss | VJFN160 | Full solid image |
| | | Matte gloss | GIY0305 | Halftone image |
| Example 34 | Clear ink A | Glossy gloss | VJFN160 | Full solid image |
| | | Matte gloss | GIY0305 | Halftone image |

TABLE 4-1-continued

| | Ink type | Printing mode | Recording medium | Printed image |
|---|---|---|---|---|
| Example 35 | Clear ink F | Glossy gloss | VJFN160 | Full solid image |
| | | Matte gloss | GIY0305 | Halftone image |
| Example 36 | Clear ink A | Glossy gloss | VJFN160 | Full solid image |
| | | Matte gloss | GIY0305 | Halftone image |
| Example 37 | Clear ink A | Glossy gloss | VJFN160 | Full solid image |
| | | Matte gloss | GIY0305 | Halftone image |
| Example 38 | Clear ink A | Glossy gloss | VJFN160 | Full solid image |
| | | Matte gloss | GIY0305 | Halftone image |
| Example 39 | Clear ink A | Glossy gloss | VJFN160 | Full solid image |
| | | Matte gloss | GIY0305 | Halftone image |
| Comp ex. 1 | Clear ink A | Glossy gloss | VJFN160 | Halftone image |
| | | Matte gloss | GIY0305 | Halftone image |
| Comp ex. 2 | Clear ink A | Glossy gloss | VJFN160 | Full solid image |
| | | Matte gloss | GIY0305 | Halftone image |
| Comp ex. 3 | Clear ink A | Glossy gloss | VJFN160 | Full solid image |
| | | Matte gloss | GIY0305 | Full solid image |
| Comp. ex. 4 | Clear ink A | Glossy gloss | VJFN160 | Full solid image |
| | | Matte gloss | GIY0305 | Halftone image |
| Comp. ex. 5 | Clear ink A | Glossy gloss | VJFN160 | Full solid image |
| | | Matte gloss | GIY0305 | Halftone image |

TABLE 4-2

| | Part to be printed with clear ink | Coverage | Number of times clear ink was overcoated | Wiper Present | Wiper Type |
|---|---|---|---|---|---|
| Example 24 | Recording medium | $D_{gloss}$ 100%<br>$D_{matte}$ 40% | 1 time | Y | Wiper 17 |
| Example 25 | Recording medium | $D_{gloss}$ 100%<br>$D_{matte}$ 40% | 1 time | Y | Wiper 18 |
| Example 26 | Recording medium | $D_{gloss}$ 100%<br>$D_{matte}$ 40% | 1 time | Y | Wiper 19 |
| Example 27 | Recording medium | $D_{gloss}$ 100%<br>$D_{matte}$ 40% | 1 time | Y | Wiper 20 |
| Example 28 | Recording medium | $D_{gloss}$ 100%<br>$D_{matte}$ 40% | 1 time | Y | Wiper 21 |
| Example 29 | Recording medium | $D_{gloss}$ 100%<br>$D_{matte}$ 40% | 1 time | Y | Wiper 22 |
| Example 30 | Recording medium | $D_{gloss}$ 100%<br>$D_{matte}$ 40% | 1 time | Y | Wiper 23 |
| Example 31 | Recording medium | $D_{gloss}$ 100%<br>$D_{matte}$ 40% | 1 time | Y | Wiper 24 |
| Example 32 | Recording medium | $D_{gloss}$ 100%<br>$D_{matte}$ 40% | 1 time | Y | Wiper 25 |
| Example 33 | Recording medium | $D_{gloss}$ 100%<br>$D_{matte}$ 40% | 1 time | Y | Wiper 26 |
| Example 34 | Recording medium | $D_{gloss}$ 100%<br>$D_{matte}$ 40% | 1 time | Y | Wiper 27 |
| Example 35 | Recording medium | $D_{gloss}$ 100%<br>$D_{matte}$ 40% | 1 time | Y | Wiper 2 |
| Example 36 | Recording medium | $D_{gloss}$ 100%<br>$D_{matte}$ 40% | 1 time | Y | Wiper 28 |
| Example 37 | Recording medium | $D_{gloss}$ 100%<br>$D_{matte}$ 40% | 1 time | Y | Wiper 29 |
| Example 38 | Recording medium | $D_{gloss}$ 100%<br>$D_{matte}$ 40% | 1 time | Y | Wiper 30 |
| Example 39 | Recording medium | $D_{gloss}$ 100%<br>$D_{matte}$ 40% | 1 time | Y | Wiper 31 |
| Comp ex. 1 | Recording medium | $D_{gloss}$ 80%<br>$D_{matte}$ 70% | 1 time | Y | Wiper 2 |
| Comp ex. 2 | Recording medium | $D_{gloss}$ 100%<br>$D_{matte}$ 40% | 1 time | Y | Wiper 2 |
| Comp ex. 3 | No printing | $D_{gloss}$ 100%<br>$D_{matte}$ 100% | — | Y | Wiper 2 |
| Comp. ex. 4 | Recording medium | $D_{gloss}$ 100%<br>$D_{matte}$ 40% | 1 time | Y | Wiper 2 |
| Comp. ex. 5 | Recording medium | $D_{gloss}$ 100%<br>$D_{matte}$ 40% | 1 time | Y | — |

TABLE 4-3

| | Heater setting temperature | | | Glossiness evaluation | | Cleaning |
|---|---|---|---|---|---|---|
| | Before printing | During printing | After printing | Glossiness difference | Evaluation | property evaluation |
| Example 24 | 60° C. | 60° C. | 70° C. | 41 | Good | Fair |
| | 65° C. | 65° C. | 70° C. | −49 | Good | Fair |
| Example 25 | 60° C. | 60° C. | 70° C. | 41 | Good | Fair |
| | 65° C. | 65° C. | 70° C. | −49 | Good | Fair |
| Example 26 | 60° C. | 60° C. | 70° C. | 41 | Good | Good |
| | 65° C. | 65° C. | 70° C. | −49 | Good | Good |
| Example 27 | 60° C. | 60° C. | 70° C. | 41 | Good | Very good |
| | 65° C. | 65° C. | 70° C. | −49 | Good | Very good |
| Example 28 | 60° C. | 60° C. | 70° C. | 41 | Good | Very good |
| | 65° C. | 65° C. | 70° C. | −49 | Good | Very good |
| Example 29 | 60° C. | 60° C. | 70° C. | 41 | Good | Very good |
| | 65° C. | 65° C. | 70° C. | −49 | Good | Very good |
| Example 30 | 60° C. | 60° C. | 70° C. | 41 | Good | Very good |
| | 65° C. | 65° C. | 70° C. | −49 | Good | Very good |
| Example 31 | 60° C. | 60° C. | 70° C. | 41 | Good | Very good |
| | 65° C. | 65° C. | 70° C. | −49 | Good | Very good |
| Example 32 | 60° C. | 60° C. | 70° C. | 41 | Good | Very good |
| | 65° C. | 65° C. | 70° C. | −49 | Good | Very good |
| Example 33 | 60° C. | 60° C. | 70° C. | 41 | Good | Very good |
| | 65° C. | 65° C. | 70° C. | −49 | Good | Very good |
| Example 34 | 60° C. | 60° C. | 70° C. | 41 | Good | Fair |
| | 65° C. | 65° C. | 70° C. | −49 | Good | Fair |

TABLE 4-3-continued

| | Heater setting temperature | | | Glossiness evaluation | | Cleaning |
|---|---|---|---|---|---|---|
| | Before printing | During printing | After printing | Glossiness difference | Evaluation | property evaluation |
| Example 35 | 50° C. | 50° C. | 70° C. | 41 | Good | Good |
| | 70° C. | 70° C. | 70° C. | −49 | Good | Good |
| Example 36 | 60° C. | 60° C. | 70° C. | 41 | Good | Poor |
| | 65° C. | 65° C. | 70° C. | −49 | Good | Poor |
| Example 37 | 60° C. | 60° C. | 70° C. | 41 | Good | Poor |
| | 65° C. | 65° C. | 70° C. | −49 | Good | Poor |
| Example 38 | 60° C. | 60° C. | 70° C. | 41 | Good | Poor |
| | 65° C. | 65° C. | 70° C. | −49 | Good | Poor |
| Example 39 | 60° C. | 60° C. | 70° C. | 41 | Good | Poor |
| | 65° C. | 65° C. | 70° C. | −49 | Good | Poor |
| Comp ex. 1 | 65° C. | 65° C. | 70° C. | 14 | Poor | Good |
| | 65° C. | 65° C. | 70° C. | −19 | Poor | Good |
| Comp ex. 2 | 65° C. | 65° C. | 70° C. | 19 | Poor | Good |
| | 65° C. | 65° C. | 70° C. | −21 | Poor | Good |
| Comp ex. 3 | 50° C. | 50° C. | 70° C. | — | Poor | Good |
| | 70° C. | 70° C. | 70° C. | — | Poor | Good |
| Comp. ex. 4 | 65° C. | 65° C. | 70° C. | 19 | Poor | Good |
| | 60° C. | 60° C. | 70° C. | −16 | Poor | Good |
| Comp. ex. 5 | 60° C. | 60° C. | 70° C. | 41 | Good | Poor |
| | 65° C. | 65° C. | 70° C. | −49 | Good | Poor |

* A glossiness difference of "—" in Comparative example 3 in Table 4-3 means that the glossiness could not be measured.
*In Table 4-3, the temperature of the heater (=$T_{gloss}$) when printing in the glossy gloss printing mode is the same as the set temperature of the heater during printing (upper row in Table 4-3). The temperature of the heater (=$T_{matte}$) when printing in the matte gloss printing mode is the same as the set temperature of the heater during printing (lower row in Table 4-3).

A glossiness difference of "-" in Comparative example 3 in Table 4-3 means that the glossiness could not be measured.

In Table 4-3, the temperature of the heater (=$T_{gloss}$) when printing in the glossy gloss printing mode is the same as the set temperature of the heater during printing (upper row in Table 4-3). The temperature of the heater (=$T_{matte}$) when printing in the matte gloss printing mode is the same as the set temperature of the heater during printing (lower row in Table 4-3).

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An ink-jet printer, comprising:

an ink container comprising an ink, the ink being a clear ink comprising a resin;

a discharge head comprising a nozzle configured to discharge the ink to a printing material;

a heater configured to heat the printing material; and a cleaner comprising a wiper configured to wipe a nozzle formation surface of the discharge head, wherein the ink-jet printer comprises a matte gloss printing mode imparting a matte gloss and a glossy gloss printing mode imparting a glossy gloss, and wherein the ink-jet printer satisfies a formula (1) below:

$$T_{matte}>T_{gloss} \quad (1),$$

wherein $T_{matte}$, represents a temperature (° C.) of the heater during printing in the matte gloss printing mode, and $T_{gloss}$ represents a temperature (° C.) of the heater during printing in the glossy gloss printing mode.

2. The printer of claim 1, wherein the ink-jet printer satisfies a formula (2) below:

$$D_{gloss}>D_{matte} \quad (2),$$

wherein $D_{matte}$ represents a coverage of an image printed in the matte gloss printing mode, and $D_{gloss}$ represents a coverage of an image printed in the glossy gloss printing mode.

3. The printer of claim 1, wherein a proportion of the resin in the clear ink is 8.0% by mass or more.

4. The printer of claim 1, wherein the clear ink comprises a surfactant, and wherein a proportion of the surfactant in the clear ink is 2.0% by mass or less.

5. The printer of claim 1, wherein the wiper comprises a first and a second layer and satisfies a formula (3) below:

$$t1<t2 \quad (3),$$

wherein t1 represents a thickness of a first layer from a side on which the wiper comes into contact with the nozzle formation surface, and t2 represents a total thickness of layers other than the first layer, and wherein the first layer has a porosity lower than that of at least one layer other than the first layer.

6. The printer of claim 5, wherein the first layer has a porosity of 0.60 or greater but 0.85 or less.

7. The printer of claim 6, wherein the at least one layer other than the first layer has a porosity of 0.80 or greater but 0.99 or less.

8. The printer of claim 5, wherein the first layer has a porosity of 0.75 or greater but 0.80 or less.

9. The printer of claim 5, wherein the first layer comprises a nonwoven fabric.

10. The printer of claim 5, wherein the at least one layer other than the first layer has a porosity of 0.80 or greater but 0.99 or less.

11. The printer of claim 5, wherein the first layer comprises a polyester.

12. The printer of claim 5, wherein the second layer comprises a rayon.

13. The printer of claim 5, wherein the wiper comprises only two layers.

14. The printer of claim 1, wherein the resin comprises a polyurethane.

15. The printer of claim 1, wherein the resin comprises a polyester.

16. The printer of claim 1, wherein the resin comprises an acrylic.

17. The printer of claim 1, wherein the wiper has an average thickness of 0.1 mm or greater but 3 mm or less.

18. An ink-jet printing method, comprising:

discharging an ink to a printing material using a discharge head having a nozzle to provide a printed layer, the ink being a clear ink comprising a resin;

heating the printing material comprising the printed layer thereon by a heater; and wiping a nozzle formation surface of the discharge head with a wiper, wherein the ink-jet printing method has a matte gloss printing mode imparting a matte gloss and a glossy gloss printing mode imparting a glossy gloss, and wherein the heating is performed to satisfy a formula (1) below:

$$T_{matte} > T_{gloss} \quad (1),$$

where wherein $T_{matte}$ represents a temperature (° C.) of the heater during printing in the matte gloss printing mode, and $T_{gloss}$ represents the temperature (° C.) of the heater during printing in the glossy gloss printing mode.

19. The method of claim 18, wherein the wiping comprises moving the discharge head and the wiper relative to each other.

20. The method of claim 18, wherein the wiper includes at least two layers and satisfies a formula below:

$$t1 < t2$$

wherein t1 represents a thickness of a first layer from a side on which the wiper comes into contact with the nozzle formation surface, and t2 represents a total thickness of layers other than the first layer, and wherein the first layer has a porosity lower than that of at least one layer other than the first layer.

* * * * *